US009945997B2

(12) United States Patent
Komatsu et al.

(10) Patent No.: US 9,945,997 B2
(45) Date of Patent: Apr. 17, 2018

(54) VIRTUAL IMAGE DISPLAY APPARATUS WITH CURVED SURFACE HAVING BOTH POSITIVE AND NEGATIVE CURVATURE AND FUNCTIONING AS BOTH REFLECTION SURFACE AND REFRACTION SURFACE

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Toshiaki Miyao, Matsumoto (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 586 days.

(21) Appl. No.: 14/468,897

(22) Filed: Aug. 26, 2014

(65) Prior Publication Data
US 2015/0062697 A1 Mar. 5, 2015

(30) Foreign Application Priority Data

Sep. 3, 2013 (JP) .................................. 2013-182159
Dec. 20, 2013 (JP) .................................. 2013-263474

(51) Int. Cl.
*G02B 27/01* (2006.01)
*G02B 5/30* (2006.01)
*G02B 6/00* (2006.01)

(52) U.S. Cl.
CPC ................. *G02B 5/30* (2013.01); *G02B 6/00* (2013.01); *G02B 27/017* (2013.01); *G02B 27/01* (2013.01); *G02B 27/0101* (2013.01); *G02B 27/0172* (2013.01); *G02B 2027/011* (2013.01); *G02B 2027/0123* (2013.01); *G02B 2027/0178* (2013.01)

(58) Field of Classification Search
CPC .............. G02B 27/017; G02B 27/0172; G02B 27/0101; G02B 27/01; G02B 2027/0178
USPC .................................................. 359/7–9, 630
See application file for complete search history.

(56) References Cited

U.S. PATENT DOCUMENTS

| 5,453,877 A | 9/1995 | Gerbe et al. | |
|---|---|---|---|
| 5,546,227 A * | 8/1996 | Yasugaki | ........... G02B 27/0172 359/630 |
| 6,201,646 B1 * | 3/2001 | Togino | ............... G02B 17/0848 359/629 |

(Continued)

FOREIGN PATENT DOCUMENTS

| JP | B2-2746697 | 5/1998 |
|---|---|---|
| JP | H10-307276 A | 11/1998 |

(Continued)

*Primary Examiner* — Stephone B Allen
*Assistant Examiner* — Ryan S Dunning
(74) *Attorney, Agent, or Firm* — Oliff PLC

(57) ABSTRACT

An intermediate image is formed inside a light guide member by a projection lens or the like, whereby a small optical system having a wide viewing angle and high performance is provided. At least one curved surface among curved surfaces forming an optical system is an opposite-sign curvature curved surface having an opposite-sign curvature point different in curvature depending on direction, whereby the optical system is placed in a satisfactory aberration correction state.

19 Claims, 28 Drawing Sheets

(56) References Cited

U.S. PATENT DOCUMENTS

| | | | |
|---|---|---|---|
| 6,222,676 B1 | 4/2001 | Togino et al. | |
| 2002/0105737 A1 | 8/2002 | Takahashi et al. | |
| 2004/0057138 A1* | 3/2004 | Tanijiri | G02B 5/10 359/868 |
| 2004/0233551 A1 | 11/2004 | Takahashi et al. | |
| 2005/0254107 A1* | 11/2005 | Amanai | G02B 5/32 359/16 |
| 2007/0064310 A1 | 3/2007 | Mukawa et al. | |
| 2007/0206289 A1 | 9/2007 | Inoguchi et al. | |
| 2012/0242561 A1 | 9/2012 | Sugihara | |
| 2012/0243102 A1 | 9/2012 | Takeda et al. | |
| 2013/0027784 A1* | 1/2013 | Takahashi | G02B 17/086 359/669 |
| 2016/0116744 A1 | 4/2016 | Takeda et al. | |

FOREIGN PATENT DOCUMENTS

| | | |
|---|---|---|
| JP | 2000-187177 A | 7/2000 |
| JP | B2-3787399 | 6/2006 |
| JP | B2-4218553 | 2/2009 |
| JP | B2-4819532 | 11/2011 |
| JP | 2012-198392 A | 10/2012 |
| JP | 2012-203113 A | 10/2012 |

* cited by examiner

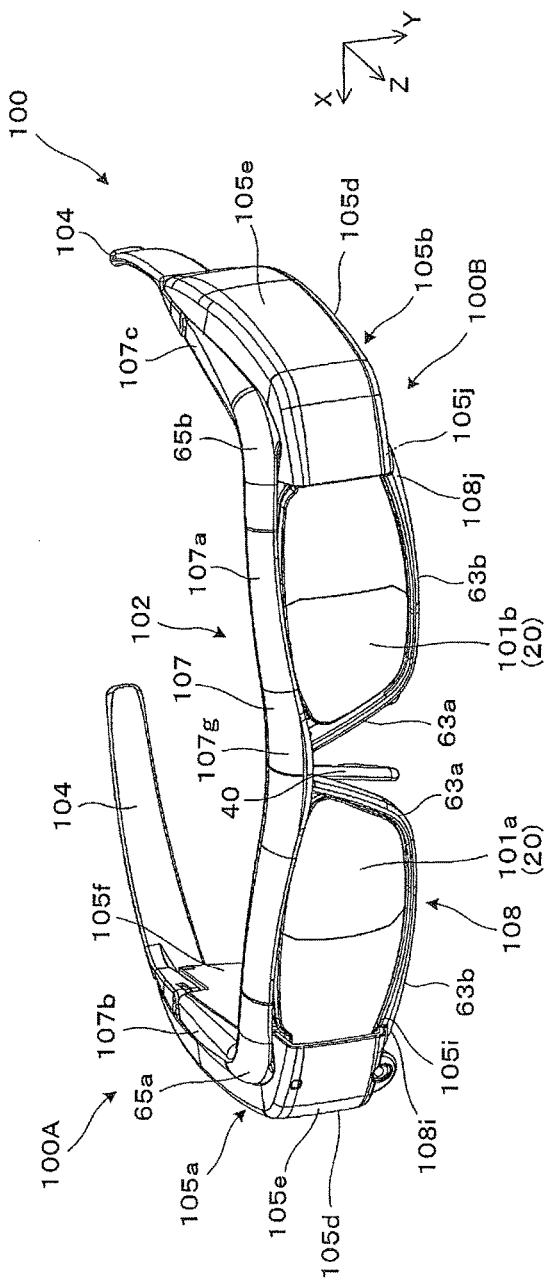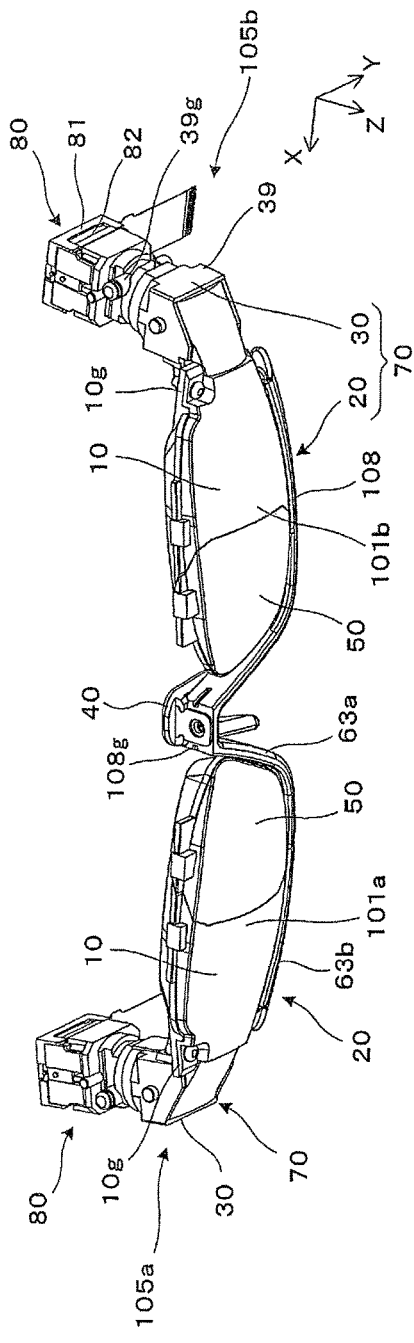
FIG. 2A
FIG. 2B

VIRTUAL IMAGE DISPLAY APPARATUS WITH CURVED SURFACE HAVING BOTH POSITIVE AND NEGATIVE CURVATURE AND FUNCTIONING AS BOTH REFLECTION SURFACE AND REFRACTION SURFACE

CROSS-REFERENCE TO RELATED APPLICATIONS

The present application is a non-provisional application of Japanese Patent Application No. 2013-182159, filed on Sep. 3, 2013, and Japanese Patent Application No. 2013-263474, filed on Dec. 20, 2013, both of which are hereby incorporated by reference in their entireties.

BACKGROUND

1. Technical Field

Embodiments of the present invention relate to a virtual image display apparatus which provides video formed by an image display element or the like to an observer, and in particular, to a virtual image display apparatus which is suitable for a head-mounted display mounted to the head of the observer.

2. Related Art

Various optical systems have been proposed as an optical system which is assembled in a virtual image display apparatus, such as a head-mounted display (hereinafter, referred to as an HMD) mounted to the head of an observer (see Japanese Patent Nos. 2746697, 3787399, 4218553, and 4819532).

For the virtual image display apparatus, such as an HMD, it is desirable to enlarge a viewing angle of video light and to reduce the weight of the apparatus. In particular, in order to improve the fit, it is important to reduce the thickness in a visual axis direction of the observer and to bring the center of gravity close to the observer.

If the field of view of the observer is completely covered and thus only video light is viewed, an external scene is not noticed by the observer, causing uneasiness for the observer. Furthermore, the external scene and video are displayed in an overlapping manner, various new usages, such as virtual reality, are produced. For this reason, there is a need for a display which displays video light in an overlapping manner without obstructing the field of view of the outside.

In order to improve the fit for the observer and to improve the appearance of the form, it is desirable to arrange a video display device at the side of the face, instead of being disposed above the eyes.

In order to reduce the size of the optical system and to position the video display device according to the position of the eyes of the observer not to obstruct the field of view, it is preferable to image display image light on the optical system once to form an intermediate image, and a relay optical system which enlarges the intermediate image to be displayed.

For example, Japanese Patent No. 2746697 proposes a relay optical system which uses a parallel planar light guide plate, in which a parabolic mirror is provided at an end surface thereof, and a projection lens, and forms an intermediate image inside the light guide plate. However, in the case of the optical system of Japanese Patent No. 2746697, the projection lens is large in size, obstructing reduction in size and weight.

Japanese Patent No. 3787399 proposes a relay optical system which uses a light guide member having a curved emission and reflection surface and a projection lens. However, the optical system of Japanese Patent No. 3787399 has no consideration of displaying an external scene to the observer. In order to display the external scene by applying the optical system, it is necessary to attach a compensation member to a reflection surface extending throughout the light guide member and to provide a half mirror on the bonding surface. However, since video light is reflected by the half mirror surface twice, video becomes very dark.

Japanese Patent No. 4218553 proposes a relay optical system which has a projection lens, a concave mirror, and a light guide plate. In this optical system, a wavelength plate and a polarization half mirror are combined, thereby enhancing reflection efficiency. However, in order to display an external scene by applying the optical system of Japanese Patent No. 4218553, it is necessary to attach a compensation lens to the concave mirror, resulting in an increase in thickness as a whole.

Japanese Patent No. 4819532 proposes a relay optical system which has a short total length and a compact arrangement due to a bent optical path. However, in the case of the optical system of Japanese Patent No. 4819532, a convex portion at the center of the light guide member or a projection lens obstructs the field of view. Furthermore, since video light passes through a half mirror, is then returned and reflected by the half mirror, and enters the eyes, video to be observed is darkened.

SUMMARY

An advantage of some aspects of the invention is that it provides a small and lightweight virtual image display apparatus which has a wide viewing angle and high performance.

A virtual image display apparatus according to an aspect of the invention includes a video element which generates video light, and a light guide member which includes two or more non-axisymmetric curved surfaces and is a part of an optical system, an intermediate image being formed inside the light guide member, in which a first surface and a third surface among a plurality of surfaces constituting the light guide member are arranged to face each other, video light from the video element is totally reflected by the third surface, is totally reflected by the first surface, is reflected by the second surface, is transmitted through the first surface, and reaches an observation side, and the light guide member has an opposite-sign curvature curved surface which includes at least one opposite-sign curvature point different in sign of curvature depending on direction as a plurality of non-axisymmetric surfaces. Here, video light is light which is formed by the video element or the like and can be recognized as a virtual image to the eyes, and as described above, forms an intermediate image inside the light guide member. It is assumed that the opposite-sign curvature curved surface is a curved surface, such as a principal surface, which contributes to light guide, for example, reflection or transmission of video light. It may be assumed that the two or more non-axisymmetric curved surfaces in the light guide member are not intended to indicate specific surfaces, and for example, the first surface or the third surface may be a non-axisymmetric curved surface or may be a flat surface. It is assumed that the two or more non-axisymmetric curved surfaces include two or more curved surfaces, such as principal surfaces, which contribute to light guide, for example, reflection of video light, or the like.

In the virtual image display apparatus described above, the intermediate image is formed inside the light guide member by the optical system or the like, and video light which is reflected in order of the third surface, the first surface, and the second surface is transmitted through the first surface and reaches the observer. For this reason, it is possible to realize bright and high-performance display with a wide viewing angle while reducing the thickness of the light guide member to reduce the size and weight of the entire optical system. For example, in the case of an optical system which extends to deflect in a specific direction, such as a horizontal direction in which the eyes are arranged along the face, the imaging conditions are significantly different between the specific direction and a direction orthogonal to the specific direction. In contrast, in the above-described virtual image display apparatus, the light guide member has the opposite-sign curvature curved surface which includes at least one opposite-sign curvature point different in sign of curvature depending on the direction. With this, for example, it is possible to achieve the optical balance between the specific direction and the direction orthogonal to the specific direction, and to reduce the size of the light guide member, consequently, the size and weight of the entire apparatus while accurately controlling the light guide of video light as the whole of the optical system and maintaining high performance.

In a specific aspect of the invention, the light guide member causes video light and external light to be visually recognized, and when the external scene is visually recognized through the first surface and the third surface, diopter substantially becomes 0. With this configuration, it is possible to reduce defocusing or distortion of external light when observing external light in a see-through manner.

In another aspect of the invention, in the light guide member, the opposite-sign curvature curved surface is a surface on the video element side to a surface from the first surface to the third surface among a plurality of surfaces constituting the light guide member.

In still another aspect of the invention, for each surface (that is, a principal surface which contributes to light guide) in the light guide member, when an expression of a surface shape is expanded as a polynomial in terms of orthogonal coordinates x and y extending in a tangential direction with the origin of each surface as a reference, and the surface shape is specified as z, and in terms of the expression of the opposite-sign curvature curved surface, when a quadratic differential value in an x direction of z at the origin is a and a quadratic differential value in a y direction of z at the origin is b, the relationship a<0<b or b<0<a is established. Here, a local coordinate (x,y,z) including the orthogonal coordinates x and y of each surface has a certain point on the surface as an origin, the z axis is in a direction normal to the surface, the x axis and the y axis are in a tangential direction of the surface, and the surface shape (curved surface shape) is specified in the local coordinate. It is assumed that the origin of the curved surface (surface) is, for example, a position through which the center of a light flux (light beam flux) passes. The quadratic differential value is a value representing the state of unevenness of the curved surface shape, and for example, when the curved surface shape is expressed by a two-variable function having x and y as variables, the quadratic differential value corresponds to a two-stage partial differential coefficient at the origin (x,y)=(0,0) for x and y. In this case, the directions of the orthogonal coordinates x and y correspond to, for example, a horizontal direction in which the eyes are arranged and the vertical direction perpendicular to the horizontal direction, whereby it is possible to more reliably perform control of video light to reach to the eyes.

In yet another aspect of the invention, for the quadratic differential value of the opposite-sign curvature curved surface in the light guide member, the following condition is satisfied.

$$1 \times 10^{-3} < |a-b|$$

In still yet another aspect of the invention, in the virtual image display apparatus described above, when an expression of a surface shape is expanded as a polynomial in terms of orthogonal coordinates x and y extending in a tangential direction from the origin with the origin of each surface constituting the optical system as a reference, and the coefficient of a term $x^m \cdot y^n$ of a polynomial expression representing a k-th surface is $Ak_{m,n}$, the following conditions of (1) to (3) are satisfied.

$$-10^{-1} < A1_{0,2} + A1_{2,0} < 10^{-2} \text{ and } -10^{-1} < A3_{0,2} + A3_{2,0} < 10^{-2} \quad (1)$$

$$|A1_{2,0} - A1_{0,2}| < 10^{-1} \text{ and } |A3_{2,0} - A3_{0,2}| < 10^{-1} \quad (2)$$

$$|A1_{2,0} - A3_{2,0}| < 10^{-2} \text{ and } |A1_{0,2} - A3_{0,2}| < 10^{-2} \quad (3)$$

Thus, the local coordinate (x,y,z) including the orthogonal coordinates x and y of each surface is defined in the same manner as in the above-described case for each curved surface in the light guide member as a part of the optical system.

In this case, an aspheric surface is used in the light guide member, and the degree of freedom of the curved surface is effectively used to succeed in obtaining a high image quality optical system. A characteristic of the action of the curved surface is basically the curvature of the curved surface, and the curvature near the origin is primarily determined by the values of the coefficients $Ak_{2,0}$ and $Ak_{0,2}$ (where k=1, 3). For this reason, it is important to appropriately set the values of the coefficients $Ak_{2,0}$ and $Ak_{0,2}$.

The condition (1) specifies the magnitude of the mean curvature of the first surface and the mean curvature of the third surface near the origin. If the magnitude exceeds an upper limit of the condition (1), the first surface and the third surface have a convex shape to the observer, and accordingly, the whole shape increases and aberration correction is difficult. If the magnitude exceeds a lower limit of the condition (1), the curvature is excessively enhanced, aberration correction is not easily performed, and the position of the light guide member becomes close to the face, causing damage to the fit.

The condition (2) specifies the difference between the curvature in the x-axis direction and the curvature in the y-axis direction of the first surface and the third surface. If the difference exceeds an upper limit of the condition (2), astigmatism which is generated in the first surface and the third surface excessively increases, and aberration correction is difficult.

The condition (3) specifies the difference between the curvature of the first surface and the curvature of the third surface relating to the x-axis direction and the y-axis direction, and affects the diopter of the light guide member to external light. If the thickness of the light guide member is T and the refractive index is N, the diopter Dx in the x-axis direction and the diopter Dy in the y-axis direction on the optical axis of the light guide member are given by the following expressions.

$$Dx=2000(N-1)(A1_{2,0}-A3_{2,0})+(2T(N-1)/N)\times A1_{2,0}\times A3_{2,0})$$

$$Dy=2000(N-1)(A1_{0,2}-A3_{0,2})+(2T(N-1)/N)\times A1_{0,2}\times A3_{0,2})$$

In general, if an error of far diopter exceeds ±1D, displeasure is caused, thus, it is desirable that the diopter of the light guide member is suppressed within a range of ±1D.

The first surface and the third surface have the shape satisfying the conditions (1) to (3), whereby aberration correction of both external light and video light are performed satisfactorily and excellent image quality can be obtained.

In further another aspect of the invention, a half mirror is formed on the second surface, video light is provided to an observer, a light transmission member is arranged integrally outside the second surface, dipoter to external light is substantially set to 0, and external light and video light are provided to the observer in an overlapping manner. In this case, it is possible to reduce defocusing or distortion of external light when observing beyond the second surface.

In still further another aspect of the invention, the virtual image display apparatus further includes a projection lens which makes video light from the video element enter the light guide member, in which at least a part of the light guide member and the projection lens constitute a relay optical system which forms an intermediate image.

In yet further another aspect of the invention, the projection lens is constituted by an axisymmetric lens and includes at least one aspheric surface.

In still yet further another aspect of the invention, the projection lens includes at least one non-axisymmetric aspheric surface.

In a further aspect of the invention, the optical system including the light guide member covers a part in front of the eyes of the observer when it is worn, and a portion where the front of the eyes is not covered is provided.

In a still further aspect of the invention, the video element has a signal light forming portion which emits signal light modulated corresponding to an image, and a scanning optical system which scans signal light entering from the signal light forming portion to emit signal light as scanning light.

A virtual image display apparatus according to another aspect of the invention includes a light guide member and a video element which generates video light. The light guide member may include a first surface, a second surface, and a third surface. The third surface may be arranged with the first surface so that the first and third surfaces face each other. Additionally, the light guide member is configured to form an intermediate image and has an opposite-sign curvature curved surface which includes different curvatures. The video element generates video light that is reflected by the third surface, is reflected by the first surface, is reflected by the second surface, is transmitted through the first surface, and then reaches an observation side.

A method of generating an image according to another aspect of the invention may include providing a light guide member having two or more non-axisymmetric curved surfaces. The light guide member may include a first surface, a second surface, and a third surface arranged to face the first surface. Additionally, the light guide member may be a part of an optical system and may be configured to form an intermediate image inside the light guide member. The light guide member also may have an opposite-sign curvature curved surface which includes at least one opposite-sign curvature point different in sign of curvature depending on direction as a plurality of non-axisymmetric surfaces. The method may further include generating video light from a video element and directing the video light to the light guide member so that: (1) the video light is totally reflected by the third surface, (2) is totally reflected by the first surface, (3) is reflected by the second surface, (4) is transmitted through the first surface, and (5) then reaches an observation side.

BRIEF DESCRIPTION OF THE DRAWINGS

The invention will be described with reference to the accompanying drawings, wherein like numbers reference like elements.

FIG. 2A is an appearance perspective view of the virtual image display apparatus of the embodiment of FIG. 1, and FIG. 2B is a perspective view showing an internal structure in which a frame or an exterior member is removed from the virtual image display apparatus of the embodiment of FIG. 1.

DESCRIPTION OF EXEMPLARY EMBODIMENTS

Hereinafter, an embodiment of a virtual image display apparatus according to some aspects of the invention will be described in detail referring to FIG. 1 and the like.

Figure 1:
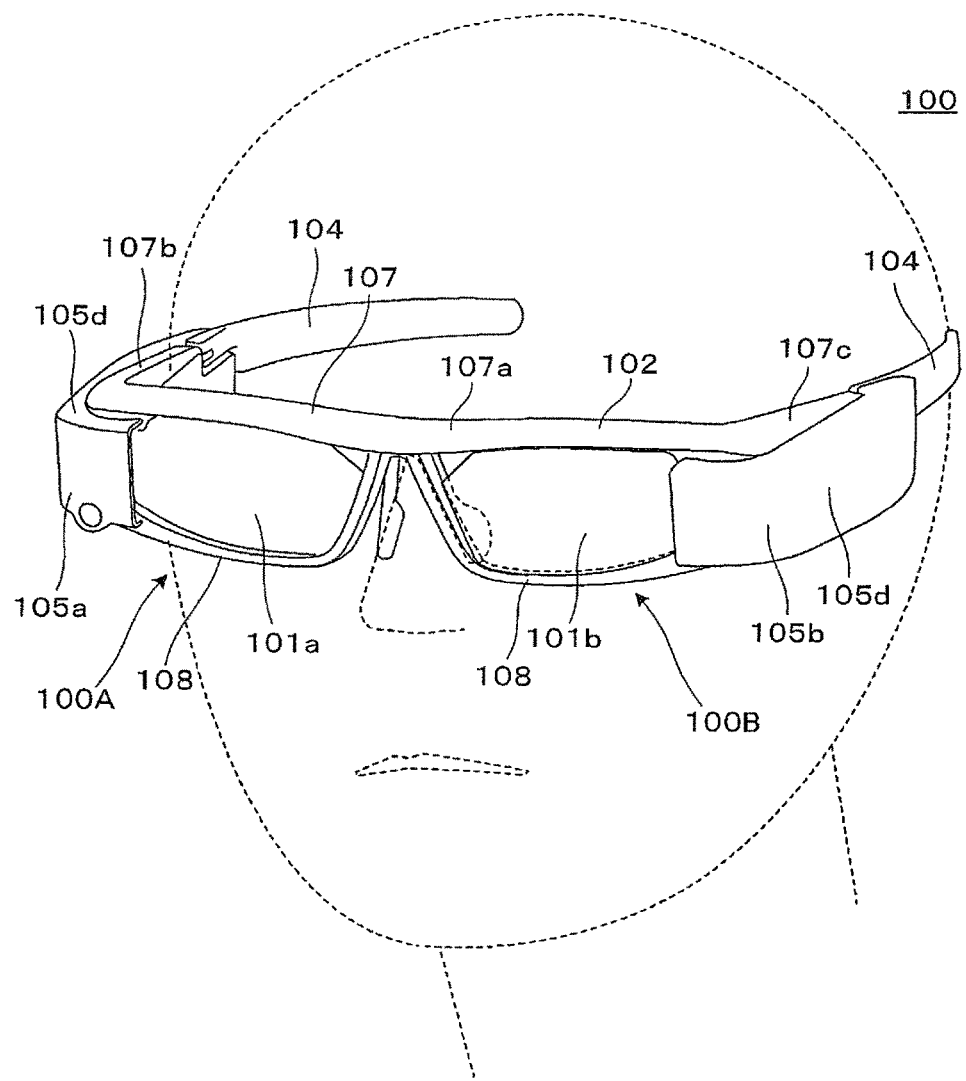
FIG. 1 is a perspective view illustrating the appearance of a virtual image display apparatus according to an embodiment of the invention.

As shown in FIG. 1, a virtual image display apparatus 100 of this embodiment is a head-mounted display which has an appearance like glasses, and can allow an observer or a user who the virtual image display apparatus 100 is mounted to visually recognize image light by a virtual image and allow the observer to visually recognize or observe an outside image in a see-through manner. The virtual image display apparatus 100 includes first and second optical members 101a and 101b which cover the front of the eyes of the observer in a see-through manner, a frame part 102 which supports both optical members 101a and 101b, and first and second image forming body parts 105a and 105b which are attached to portions from both of left and right ends of the frame part 102 to rear temple parts (temples) 104. A first display device 100A in which the first optical member 101a and the first image forming body part 105a on the left side of the drawing are combined is a part which forms a virtual image for a right eye, and functions as a virtual image display apparatus singly. A second display device 100B in which the second optical member 101b and the second image forming body part 105b on the right side of the drawing are combined is a part which forms a virtual image for a left eye, and functions as a virtual image display apparatus singly.

FIG. 2A is a perspective view illustrating the appearance of a front side of the virtual image display apparatus 100, and FIG. 2B is a perspective view of the front side when the virtual image display apparatus 100 is partially disassembled.

As shown in the drawing, the frame part 102 provided in the virtual image display apparatus 100 includes a frame 107 which is arranged on an upper side, and a protector 108 which is arranged on a lower side. In the frame part 102, the frame 107 on the upper side shown in FIG. 2A is an elongated sheet-like member which is bent in a U shape within an XZ plane, and includes a front portion 107a which extends in a right-left horizontal direction (X direction), and a pair of side portions 107b and 107c which extend in a front-back depth direction (Z direction). The frame 107, that is, the front portion 107a and the side portions 107b and 107c are a metal integral component formed of aluminum die casting or various metal materials. The width in the depth direction (Z direction) of the front portion 107a is sufficiently greater than the thickness or width of the light guide device 20 corresponding to the first and second optical members 101a and 101b. On the left side of the frame 107, specifically, in a lateral end portion 65a which is a portion from a left end portion in the front portion 107a to the side portion 107b, the first optical member 101a and the first image forming body part 105a are aligned and directly fixed by screws to be thus supported. On the right side of the frame 107, specifically, in a lateral end portion 65b which is a portion from a right end portion in the front portion 107a to the side portion 107c, the second optical member 101b and the second image forming body part 105b are aligned and directly fixed by screws to be thus supported. The first optical member 101a and the first image forming body part 105a are aligned with each other by fitting, and the second optical member 101b and the second image forming body part 105b are aligned with each other by fitting.

The protector 108 shown in FIGS. 2A and 2B is an under rim-like member, and is arranged and fixed below the frame 107 shown in FIG. 2A. A central portion 108g of the protector 108 is fitted and fixed to a central portion 107g of the frame 107 by screws. The protector 108 is an elongated sheet-like member which is bent in a two-stage crank shape, and is integrally formed of a metal material or a resin material. A first distal end portion 108i of the protector 108 is fixed in a state of being fitted into a concave portion 105i provided in an external member 105e of a cover-like exterior member 105d covering the first image forming body part 105a. A second distal end portion 108j of the protector 108 is fixed in a state of being fitted into a concave portion 105j provided in an external member 105e of an exterior member 105d covering the second image forming body part 105b.

The frame 107 plays a part in not only supporting the first and second image forming body parts 105a and 105b but also protecting the inside of the first and second image forming body parts 105a and 105b in corporation with the exterior member 105d. The frame 107 and the protector 108 is separated from or is in loose contact with an elliptical peripheral portion of the light guide device 20 excluding the root side connected to the first and second image forming body parts 105a and 105b. For this reason, even if there is a difference in coefficient of thermal expansion between the central light guide device 20 and the frame part 102 including the frame 107 and the protector 108, expansion of the light guide device 20 inside the frame part 102 is permitted, whereby it is possible to prevent the occurrence of distortion, deformation, and damage of the light guide device 20.

A bridge part 40 is provided together with the frame 107. The bridge part 40 plays a part in coming into contact with the nose of the observer to support the frame part 102. That is, the frame part 102 is arranged in front of the face of the observer by the bridge part 40 supported by the nose and a pair of temple parts 104 supported by the ears. The bridge part 40 is fixed by screws to be sandwiched between the central portion 107g of the front portion 107a of the frame 107 constituting the frame part 102 and the central portion 108g of the protector 108 constituting the frame part 102.

Figure 3:
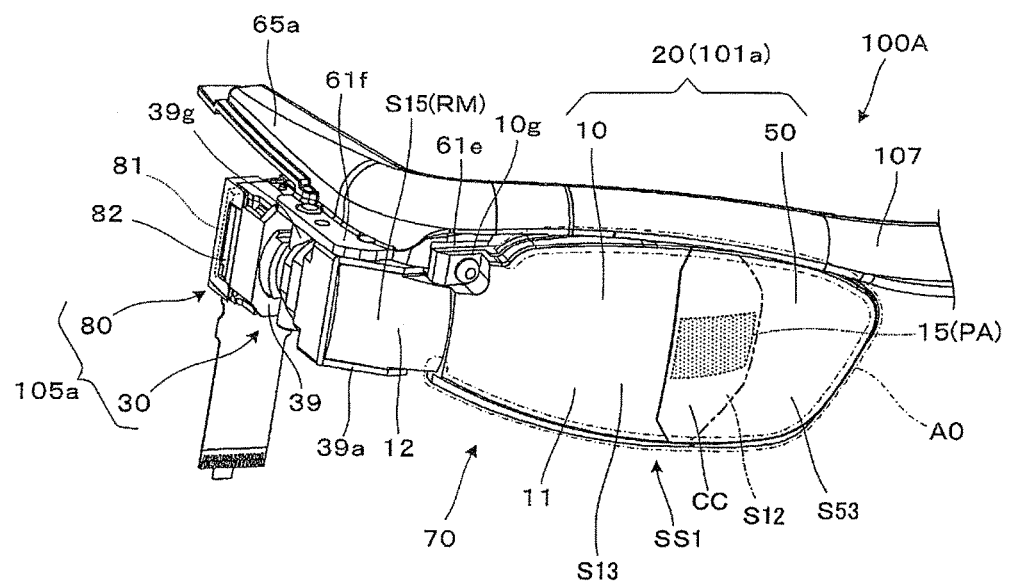
FIG. 3 is a perspective view illustrating the structure of a first display device of the virtual image display apparatus of the embodiment of FIG. 1 and showing a state where an exterior member and the like are removed.

As shown in FIG. 3, the first display device 100A can be considered to include a projection see-through device 70 which is an optical system for projection, and an image display device 80 which forms video light. The projection see-through device 70 plays a part in projecting an image formed by the first image forming body part 105*a* on the eyes of the observer as a virtual image. The projection see-through device 70 includes a light guide member 10 for light guide and see-through, a light transmission member 50 for see-through, and a projection lens 30 for imaging. That is, the first optical member 101*a* or the light guide device 20 is constituted by the light guide member 10 and the light transmission member 50, and the first image forming body part 105*a* is constituted by the image display device 80 and the projection lens 30.

Figure 4:
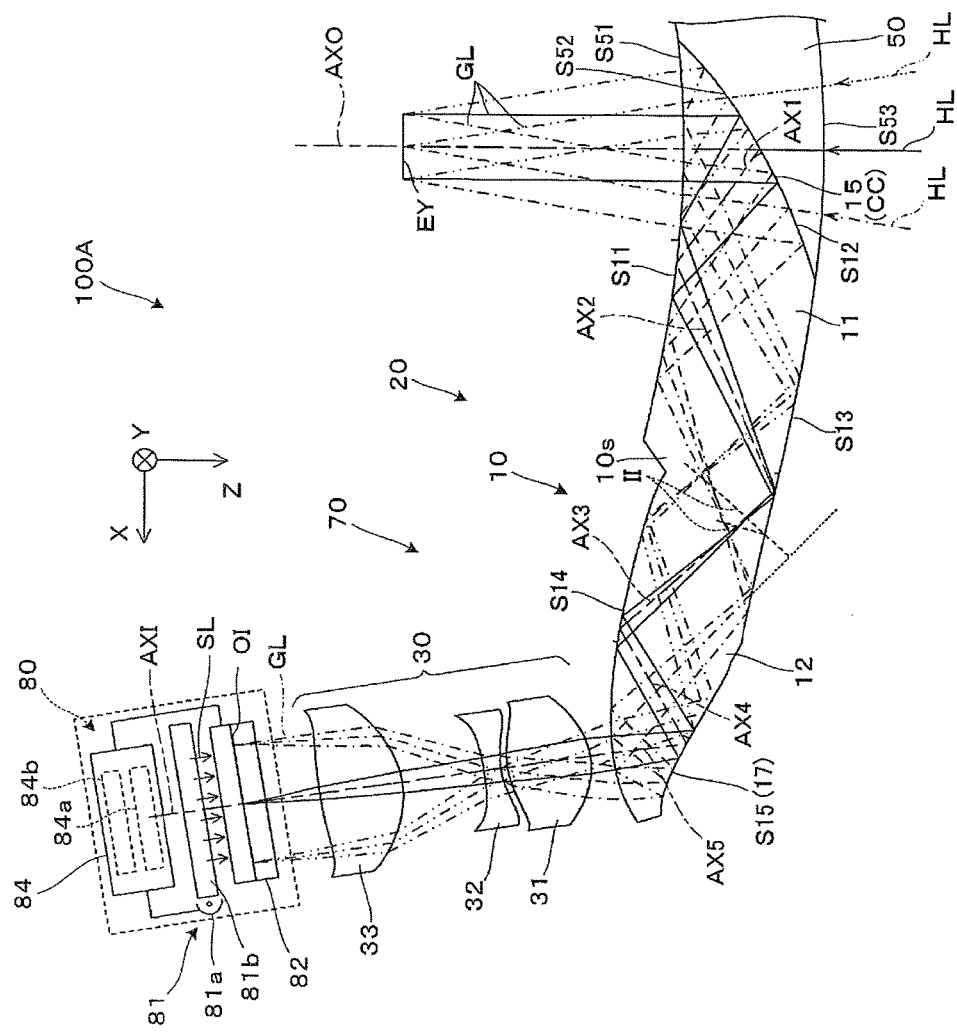
FIG. 4 is a sectional view of a main body portion of the first display device constituting the virtual image display apparatus of the embodiment of FIG. 1 in plan view.

Hereinafter, the image display device 80 and the projection lens 30 constituting the first image forming body part 105*a* will be described referring to FIGS. 3, 4, and the like.

The image display device 80 has an illumination device 81 which emits illumination light, a video display element 82 which is a transmissive spatial light modulation device, and a drive control unit 84 which controls the operation of the illumination device 81 and the video display element 82.

The illumination device 81 of the image display device 80 has a light source 81*a* which generates light including three colors of red, green, and blue, and a backlight guide part 81*b* which diffuses light from the light source to convert light to a light flux (light beam flux) having a rectangular cross-section. The video display element (video element) 82 is constituted by, for example, a liquid crystal display, and spatially modulates illumination light from the illumination device 81 to form image light to be displayed, such as a motion image. The drive control unit 84 includes a light source drive circuit 84*a* and a liquid crystal drive circuit 84*b*. The light source drive circuit 84*a* supplies power to the illumination device 81 to emit illumination light with stable luminance. The liquid crystal drive circuit 84*b* outputs an image signal or a drive signal to the video display element (video element) 82, thereby forming color video light or image light to be a source of a motion image or a still image as a transmittance pattern. Although an image processing function can be provided in the liquid crystal drive circuit 84*b*, the image processing function may be provided in an external control circuit.

The projection lens 30 is a projection optical system which includes three optical elements 31 to 33 as components, and includes a lens barrel 39 which stores and supports the optical elements 31 and 33. The optical elements 31 to 33 are, for example, axisymmetric aspheric lenses, and forms an intermediate image corresponding to a display image of the video display element 82 inside the light guide member 10 in corporation with apart of the light guide member 10. The lens barrel 39 has a rectangular frame-like engagement member 39*a* on the front end side. The engagement member 39*a* is engaged with the distal end portion of the light guide member 10 on a second light guide portion 12 side, and enables positioning of the light guide member 10 with respect to the lens barrel 39.

Hereinafter, the function, operation, and the like of the projection see-through device 70 and the like will be described in detail referring to FIG. 4. In the projection see-through device 70, the light guide member 10 which is a part of the prism-type light guide device 20 is an arc-like member which is, for example, bent to follow the face in plan view. In the light guide member 10, a first light guide portion 11 is arranged on the center side near the nose, that is, a light emission side, and has a first surface S11, a second surface S12, and a third surface S13 as a lateral surface having an optical function. A second light guide portion 12 is arranged on a peripheral side separated from the nose, that is, a light incidence side, and has a fourth surface S14 and a fifth surface S15 as a lateral surface having an optical function. Of these, the first surface S11 and the fourth surface S14 are continuously adjacent to each other, and the third surface S13 and the fifth surface S15 are continuously adjacent to each other. The second surface S12 is arranged between the first surface S11 and the third surface S13, and the fourth surface S14 and the fifth surface S15 are adjacent to each other at a large angle.

In the light guide member 10, the first surface S11 is a free curved surface which has, as a local z axis, an emission-side optical axis AXO parallel to the Z axis, the second surface S12 is a free curved surface which has, as a local z axis, an optical axis AX1 included in a reference surface (a cross-section in the drawing) parallel to the XZ plane and inclined with respect to the Z axis, and the third surface S13 is a free curved surface which has, as a local z axis, the emission-side optical axis AXO. The fourth surface S14 is a free curved surface which has, as a local z axis, an optical axis parallel to a bisector of a pair of optical axes AX3 and AX4 included in the reference surface parallel to the XZ plane and inclined with respect to the Z axis, and the fifth surface S15 is a free curved surface which has, as a local z axis, an optical axis parallel to a bisector of a pair of optical axes AX4 and AX5 included in the reference surface parallel to the XZ plane and inclined with respect to the Z axis. On the extension of the optical axis AX5 on the fifth surface S15 side, an incidence-side optical axis AXI is arranged. The first to fifth surfaces S11 to S15 have a symmetrical shape in terms of the vertical Y-axis direction while sandwiching the reference surface (the cross-section in the drawing), which is in parallel with the XZ plane extending in a horizontal direction and through which the optical axes AX1 to AX5 and the like pass.

In particular, among a plurality of surfaces constituting the light guide member 10, at least one free curved surface which is a surface other than a surface from the first surface S11 to the third surface S13 includes at least one point different in sign of curvature depending on direction. With this, it is possible to reduce the size of the light guide member 10 while controlling the light guide of video light accurately. Although the details will be described below in examples, in a case shown in the drawing, the fourth surface S14 on the image display device 80 side from the surface from the first surface S11 to the third surface S13, that is, on the video display element (video element) 82 side has a curved surface shape different in sign of curvature depending on direction at an origin. Hereinafter, a point (the origin of the fourth surface S14) different in sign in curvature depending on direction is referred to as an opposite-sign curvature point, and a curved surface (the fourth surface S14) including the opposite-sign curvature point is referred to as an opposite-sign curvature curved surface.

In the light guide member 10, a main body 10*s* is formed of a resin material having a high light transmission property in a visible region, and is molded by injecting and solidifying thermoplastic resin inside a mold. As the material of the main body 10*s*, for example, cycloolefin polymer or the like may be used. Although the main body 10*s* is an integrated product, as described above, the guide member 10 can be considered in the first light guide portion 11 and the second light guide portion 12 functionally. The first light guide portion 11 enables light guide and emission of video light GL and enables see-through of external light HL. The second light guide portion 12 enables incidence and light guide of video light GL.

In the first light guide portion 11, the first surface S11 functions as a refraction surface which emits video light GL outside the first light guide portion 11 and functions as a total reflection surface which totally reflects video light GL on the inner surface side. The first surface S11 is arranged in front of an eye EY, and is formed to have, for example, a concave surface shape to the observer. The first surface S11 is a surface which is formed of a hard coat layer 27 on the surface of the main body 10s.

The second surface S12 is the surface of the main body 10s, and a half mirror layer 15 is attached thereto. The half mirror layer 15 is a reflection film (that is, transflective film) having a light transmission property. The half mirror layer (transflective film) 15 is formed on a narrowed partial area PA of the second surface S12 in terms of the vertical direction along the Y axis instead of the entire second surface S12 (see FIG. 3). The half mirror layer 15 is formed by forming a metal reflection film or a dielectric multilayer film on the partial area PA of the underlayer surface of the main body 10s. The reflectance of the half mirror layer 15 to video light GL is set to be equal to or greater than 10% and equal to or less than 50% within an assumed incidence angle range of video light GL from the viewpoint of facilitating the observation of external light HL in a see-through manner. Specifically, the reflectance of the half mirror layer 15 to video light GL in a specific example is set to, for example, 20%, and the transmittance of the half mirror layer 15 of video light GL is set to, for example, 80%.

The third surface S13 functions as a total reflection surface which totally reflects video light GL on the inner surface side. The third surface S13 is arranged in front of the eye EY, and, similarly to the first surface S11, has a concave surface shape to the observer. When external light HL passing through the first surface S11 and the third surface S13 is viewed, diopter is substantially 0. The third surface S13 is a surface which is formed of the hard coat layer 27 on the surface of the main body 10s.

In the second light guide portion 12, the fourth surface S14 functions as a total reflection surface which totally reflects video light GL on the inner surface side. The fourth surface S14 also functions as a refraction surface which makes video light GL enter the second light guide portion 12. That is, the fourth surface S14 doubles as a light incidence surface which makes video light GL enter the light guide member 10 from the outside, and a reflection surface which makes video light GL propagate through the light guide member 10. As described above, the fourth surface S14 is an opposite-sign curvature curved surface which has an opposite-sign curvature point different in sign of curvature depending on direction, and gives astigmatism to be different in focal position in the right-left direction and the up-down direction. With this, astigmatism which occurs in another surface is cancelled, and the imaging state is balanced. The fourth surface S14 is a surface which is formed of the hard coat layer 27 on the surface of the main body 10s.

In the second light guide portion 12, as described above, the fifth surface S15 is formed by forming a light reflection film RM formed of an inorganic material on the surface of the main body 10s, and functions as a reflection surface.

As described above, the light transmission member 50 is fixed integrally with the light guide member 10 and is constituted as the single light guide device 20. The light transmission member 50 is a member (auxiliary optical block) which assists a see-through function of the light guide member 10, and has a first transmission surface S51, a second transmission surface S52, and a third transmission surface S53 as a lateral surface having an optical function.

The second transmission surface S52 is arranged between the first transmission surface S51 and the third transmission surface S53. The first transmission surface S51 is on a curved surface extended from the first surface S11 of the light guide member 10, the second transmission surface S52 is a curved surface which is bonded integrally to the second surface S12 by an adhesive layer CC, and the third transmission surface S53 is on a curved surface extended from the third surface S13 of the light guide member 10. Of these, the second transmission surface S52 and the second surface S12 of the light guide member 10 are integrated by bonding through the thin adhesive layer CC, and thus have a shape having the substantially same curvature.

The light transmission member (auxiliary optical block) 50 exhibits a high light transmission property in a visible region, and a main body portion of the light transmission member 50 is formed of thermoplastic resin having the substantially same refractive index as the main body 10s of the light guide member 10. The light transmission member 50 is formed by hard coat deposition along with the main body 10s in a state where the main body portion is bonded to the main body 10s of the light guide member 10. That is, similarly to the light guide member 10, in the light transmission member 50, a hard coat layer 27 is formed on the surface of the main body portion. The first transmission surface S51 and the third transmission surface S53 are surfaces which are formed of the hard coat layer 27 on the surface of the main body portion.

Hereinafter, the optical path of video light GL or the like in the virtual image display apparatus 100 will be described. Video light GL emitted from the video display element (video element) 82 is converged by the projection lens 30 and enters the fourth surface S14 having positive refractive power provided in the light guide member 10.

Video light GL passing through the fourth surface S14 of the light guide member 10 advances while being converged, when passing through the second light guide portion 12, is reflected by the fifth surface S15 having comparatively weak negative refractive power, enters the fourth surface S14 from the inside again, and is then reflected.

Video light GL reflected by the fourth surface S14 of the second light guide portion 12 enters and is totally reflected by the third surface S13 having comparatively weak positive refractive power in the example shown in the drawing in the first light guide portion 11, and enters and is reflected by the first surface S11 having comparatively weak negative refractive power in the example shown in the drawing. Before and after passing through the third surface S13, video light GL forms an intermediate image in the light guide member 10. An image surface II of the intermediate image corresponds to an image surface OI of the video display element 82.

While video light GL totally reflected by the first surface S11 enters the second surface S12, in particular, video light GL entering the half mirror layer 15 is partially transmitted through and partially reflected by the half mirror layer 15 and enters and passes through the first surface S11 again. The half mirror layer 15 acts as having comparatively strong positive refractive power to video light GL to be reflected by the half mirror layer 15. The first surface S11 acts as having negative refractive power in the example shown in the drawing to video light GL passing therethrough.

Video light GL passing through the first surface S11 enters the pupil of the eye EY of the observer or an equivalent position as a substantially parallel light flux. That is, the observer observes an image formed on the video display element (video element) 82 by video light GL as a virtual image.

Out of external light HL, a light component which enters a +X side from the second surface S12 of the light guide member 10 passes through the third surface S13 and the first surface S11 of the first light guide portion 11, and at this time, positive and negative refractive powers are cancelled and aberration is corrected. That is, the observer observes an outside image with little distortion over the light guide member 10. Similarly, out of external light HL, a light component which enters a −X side from the second surface S12 of the light guide member 10, that is, alight component which enters the light transmission member 50 passes through the third transmission surface S53 and the first transmission surface S51 provided in the light transmission member 50, and at this time, positive and negative refractive powers are cancelled and aberration is corrected. That is, the observer observes an outside image with little distortion over the light transmission member 50. Out of external light HL, a light component which enters the light transmission member 50 corresponding to the second surface S12 of the light guide member 10 passes through the third transmission surface S53 and the first surface S11, and at this time, positive and negative refractive powers are cancelled and aberration is corrected. That is, the observer observes an outside image with little distortion over the light transmission member 50. The second surface S12 of the light guide member 10 and the second transmission surface S52 of the light transmission member 50 have the substantially same curved surface shape and the substantially same refractive index, and the gap of both surfaces is filled with the adhesive layer CC having the substantially same refractive index. That is, the second surface S12 of the light guide member 10 or the second transmission surface S52 of the light transmission member 50 does not act as a refraction surface to external light HL.

However, since external light HL entering the half mirror layer 15 is partially transmitted through and partially reflected by the half mirror layer 15, external light HL from a direction corresponding to the half mirror layer 15 is vulnerable to the transmittance of the half mirror layer 15. On the other hand, since video light GL is entered from a direction corresponding to the half mirror layer 15, the observer observes an outside image along with an image formed on the video display element (video element) 82 in the direction of the half mirror layer 15.

Out of video light GL which propagates through the light guide member 10 and enters the second surface S12, a light component which has not been reflected by the half mirror layer 15 enters the light transmission member 50, and is prevented from being returned to the light guide member 10 by an antireflection portion (not shown) provided in the light transmission member 50. That is, video light GL passing through the second surface S12 is prevented from being returned on the optical path and becoming stray light. Furthermore, external light HL which enters from the light transmission member 50 side and reflected by the half mirror layer 15 is returned to the light transmission member 50, and is prevented from being emitted to the light guide member 10 by the antireflection portion (not shown) provided in the light transmission member 50. That is, external light HL reflected by the half mirror layer 15 is prevented from being returned on the optical path and becoming stray light.

Figure 5:
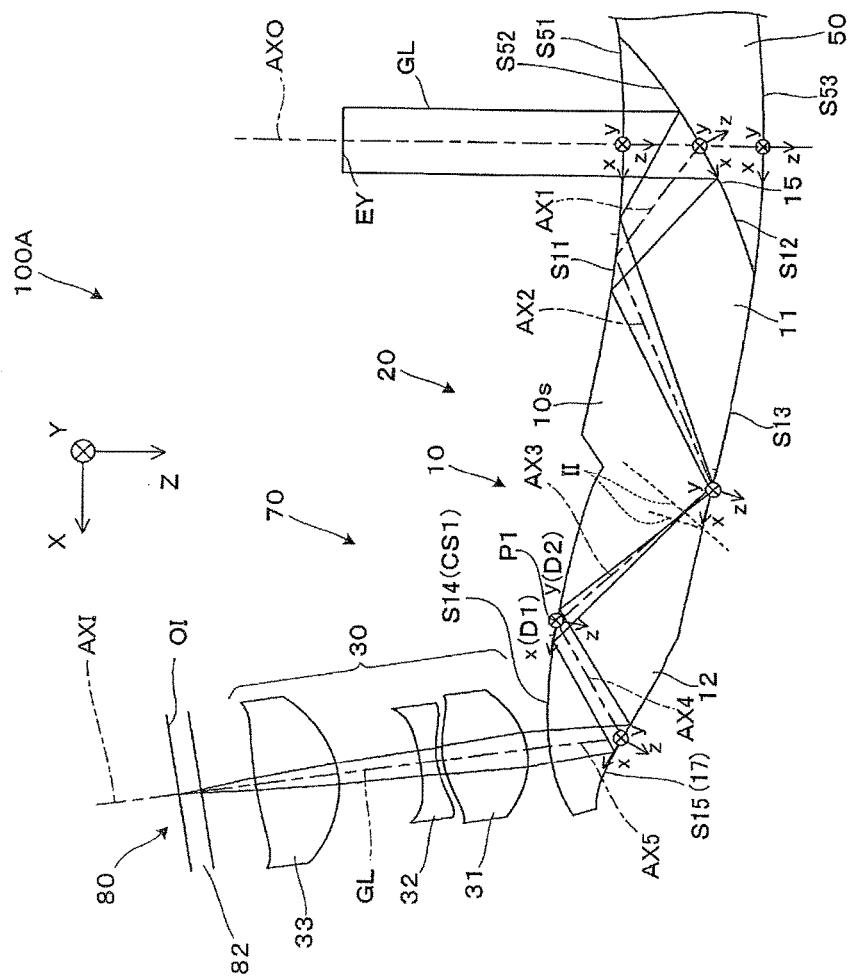
FIG. 5 is a sectional view illustrating an optical surface or an optical path in a light guide member of the first display device according to one embodiment.

FIG. 5 is a diagram illustrating the optical axes AX1 to AX4 in the light guide member 10 or local coordinates. In the following description, considering the evaluation of the optical system or convenience of expression, an optical surface or an optical path is specified in terms of a reversing direction from the eye EY of the observer toward the video display element 82 of the image display device 80. In an actual optical system, while light emitted from the video display element 82 sequentially passes through the projection lens 30 and the light guide member 10 and reaches the eye EY, in this state, the evaluation of the optical system is difficult. For this reason, evaluation and design are performed assuming that light from an infinitely distant light source from a stop at the position of the eye EY enters the light guide member 10 and is imaged on the video display element 82 through the projection lens 30, and data of the optical system described below in detail is displayed in this order. The light transmission member 50 which is bonded to the light guide member 10 and used integrally is the extension of the shape of the light guide member 10, and description thereof will be omitted.

In the light guide member 10 shown in the drawing, the optical axis of the first surface S11 matches the emission-side optical axis AXO, and the local coordinate (x,y,z) of the first surface S11 has a translational relationship with a global coordinate (X,Y,Z) and has an origin on the first surface S11. That is, a z direction of the local coordinate is an advancing direction (a reversing direction of a light beam) on the emission-side optical axis AXO, and a y direction of the local coordinate is in parallel with the Y direction of the global coordinate. In the subsequent surfaces, the y direction of the local coordinate is in parallel with the Y direction of the global coordinate.

The optical axis of the second surface S12 is appropriately inclined with respect to the emission-side optical axis AXO, and the local coordinate of the second surface S12 is appropriately rotated around the Y axis and translated with respect to the global coordinate and has an origin on the second surface S12. A z direction of the local coordinate of the second surface S12 is an intermediate direction between the emission-side optical axis AXO and the optical axis AX1 at the center of a light flux from the second surface S12 toward the first surface S11.

The optical axis of the third surface S13 matches the emission-side optical axis AXO, and the local coordinate of the third surface S13 has a translational relationship with the global coordinate and has an origin on the extended surface of the third surface S13, that is, on the third transmission surface S53.

With the above, an intermediate direction between the optical axis AX1 at the center of a light flux from the second surface S12 toward the first surface S11 and the optical axis AX2 at the center of a light flux from the first surface S11 toward the third surface S13 matches a direction normal to the first surface S11 at the center (an intersection point of the optical axes AX1 and AX2) of a light flux on the first surface S11. An intermediate direction between the optical axis AX2 at the center of a light flux from the first surface S11 toward the third surface S13 and the optical axis AX3 at the center of a light flux from the third surface S13 toward the fourth surface S14 matches a direction normal to the third surface S13 at the center (an intersection point of the optical axes AX2 and AX3) of a light flux on the third surface S13.

In an optical path from the third surface S13 toward the next fourth surface S14, the local coordinate corresponds to an advancing direction (a reversing direction of a light beam). That is, a z direction of the local coordinate from the third surface S13 to the fourth surface S14 matches the optical axis AX3 at the center of the light flux, and a y direction of the local coordinate is in parallel with the Y direction of the global coordinate.

The origin of the local coordinate of the fourth surface S14 is on the fourth surface S14. A z direction of the local coordinate of the fourth surface S14, that is, the optical axis of the fourth surface S14 is a bisector of the optical axis AX3 at the center of the light flux from the third surface S13 toward the fourth surface S14 and the optical axis AX4 at the center of the light flux from the fourth surface S14 toward the fifth surface S15.

The origin of the local coordinate of the fifth surface S15 is on the fifth surface S15. A z direction of the local coordinate of the fifth surface S15, that is, the optical axis of the fifth surface S15 is a bisector of the optical axis AX4 at the center of the light flux from the fourth surface S14 toward the fifth surface S15 and the optical axis AX5 at the center of the light flux from the fifth surface S15 toward the fourth surface S14.

The shape of the first surface S11 of the light guide member 10 is expressed by the following expression using the local coordinate (x,y,z) of the first surface S11.

$$z = \Sigma\{A1_{m,n} \cdot (x^m \cdot y^n)\} \quad (4)$$

Here, $A1_{m,n}$ is a coefficient of a (m·n) th term expanded as a polynomial, and m and n are an integer equal to or greater than 0.

The shape of the second surface S12 of the light guide member 10 is expressed by the following expression using the local coordinate (x,y,z) of the second surface S12.

$$z = \Sigma\{A2_{m,n} \cdot (x^m \cdot y^n)\} \quad (5)$$

Here, $A2_{m,n}$ is a coefficient of a (m·n) th term expanded as a polynomial.

The shape of the third surface S13 of the light guide member 10 is expressed by the following expression using the local coordinate (x,y,z) of the third surface S13.

$$z = \Sigma\{A3_{m,n} \cdot (x^m \cdot y^n)\} \quad (6)$$

Here, $A3_{m,n}$ is a coefficient of a (m·n) th term expanded as a polynomial.

In this embodiment, the first to third surfaces S11 to S13 of the light guide member 10 satisfy the following three conditions.

$$-10^{-1} < A1_{0,2} + A1_{2,0} < 10^{-2} \text{ and } -10^{-1} < A3_{0,2} + A3_{2,0} < 10^{-2} \quad (1)$$

$$|A1_{2,0} - A1_{0,2}| < 10^{-1} \text{ and } |A3_{2,0} - A3_{0,2}| < 10^{-1} \quad (2)$$

$$|A1_{2,0} - A3_{2,0}| < 10^{-2} \text{ and } |A1_{0,2} - A3_{0,2}| < 10^{-2} \quad (3)$$

The shapes of the first to third surfaces S11 to S13 are set to satisfy the three conditions, whereby aberration correction of both external light HL and video light GL can be performed satisfactorily and excellent image quality can be obtained.

An interval between the first surface S11 and the third surface S13 of the light guide member 10 is equal to or greater than 5 mm and equal to or less than 15 mm. An inclination angle of the second surface S12 with respect to the first surface S11 is equal to or greater than 20° and equal to or less than 40°.

The fourth surface S14 or the fifth surface S15 of the light guide member 10 is provided for optical path adjustment or more accurate aberration correction.

The shape of the fourth surface S14 of the light guide member 10 is expressed by the following expression using the local coordinate (x,y,z) of the fourth surface S14.

$$z = \Sigma\{A4_{m,n} \cdot (x^m \cdot y^n)\} \quad (7)$$

Here, $A4_{m,n}$ is a coefficient of a (m·n) th term expanded as a polynomial.

The shape of the fifth surface S15 of the light guide member 10 is expressed by the following expression using the local coordinate (x,y,z) of the fifth surface S15.

$$z = \Sigma\{A5_{m,n} \cdot (x^m \cdot y^n)\} \quad (8)$$

Here, $A5_{m,n}$ is a coefficient of a (m·n) th term expanded as a polynomial.

In this embodiment, the fourth surface S14 or the fifth surface S15 expressed by Expression (7) or (8) is an opposite-sign curvature curved surface CS1. That is, the curved surface shape of the fourth surface S14 or the fifth surface S15 includes at least one opposite-sign curvature point different in sign of curvature depending on direction. Specifically, for example, in a case shown in FIG. 4, the sign of curvature in the x direction (first direction D1) and the sign of curvature in the y direction (second direction D2) perpendicular to the x direction are reversed at the origin of the fourth surface S14. That is, the origin of the fourth surface S14 is an opposite-sign curvature point P1. Here, it is assumed that a state where curvature has opposite signs is represented by quadratic differential values. That is, a value at the origin (0,0) of a second derivative obtained by two-stage partial differentiation on Expression (7) in terms of x is referred to as a quadratic differential value a, and a value at the origin (0,0) of a second derivative obtained by two-stage differentiation in terms of y is referred to as a quadratic differential value b. These values respectively represent the uneven states in the x direction and the y direction of the curved surface at the origin. Accordingly, when the value a and the value b are different in sign, that is, when a<0<b or b<0<a, curvature is different in the x direction and the y direction, and the state of the curved surface is different to be convex or concave. This shape is provided; it is possible to appropriately adjust aberration of video light in the x direction and the y direction. It is preferable that the values of the quadratic differential values a and b are within the following numerical range.

$$1 \times 10^{-3} < |a - b| \quad (9)$$

As in the virtual image display apparatus 100 of this embodiment, in the case of an optical system which extends to deflect in the horizontal direction (specific direction) in which the eyes are arranged along the face, the imaging conditions are significantly different between the horizontal direction and the vertical direction perpendicular to the horizontal direction. In contrast, in this embodiment, in the light guide member 10, similarly to the first surface S11 and the like, at least the fourth surface S14 is one of the principal surfaces which contribute to light guide, such as reflection or transmission of video light GL, and is an opposite-sign curvature curved surface CS1 having an opposite-sign curvature point P1 different in sign of curvature in the x direction (first direction) corresponding to the horizontal direction, in which the eyes are arranged, and in the y direction (second direction) corresponding to the vertical direction orthogonal to the horizontal direction, as described above. With this, for example, it is possible to achieve the optical balance in the optical system including the light guide member 10 while suppressing an increase in the size of the light guide member 10 extending to deflect in the horizontal direction, and to reduce the size of the light guide member, consequently, the size and weight of the entire apparatus while accurately controlling the light guide of video light GL as the whole of the optical system and maintaining high performance.

In the virtual image display apparatus 100 of this embodiment, an intermediate image is formed inside the light guide member 10 by the projection lens 30 or the like, and video light GL totally reflected by two or more surfaces in order of the third surface S13, the first surface S11, and the second surface S12 is transmitted through the first surface S11 and reaches the eye EY of the observer. Thus, it is possible to realize bright high-performance display with a wide viewing angle while reducing the thickness of the light guide member 10 to reduce the size and weight of the entire optical system. External light HL can be observed through the first surface S11 and the third surface S13, and diopter at this time is substantially 0. For this reason, it is possible to reduce defocusing or distortion of external light HL when observing external light HL in a see-through manner. The shape of the light guide member 10 can have a shape along the face of the observer, the center of gravity can be brought close to the face, and excellent design can be achieved. In particular, the fourth surface S14 or the like which is a surface other than the first surface S11 and the third surface S13 is a curved surface having a point different in curvature depending on direction, whereby it is possible to reduce the size of the light guide member 10, consequently, the size and weight of the entire virtual image display apparatus 100.

EXAMPLES

Hereinafter, examples of the projection see-through device assembled in the virtual image display apparatus according to the invention will be described. Symbols used in each example are summarized below.
SPH: pupil
FFSk: free-form surface (k in light guide member=surface number)
ASPk: axisymmetric aspheric surface (k in projection optical system=surface number)
SPH: spherical surface or flat surface (protection glass surface)
R: radius of curvature
T: axial surface interval
Nd: refractive index of optical material with respect to d line
Vd: Abbe number of optical material with respect to d line
TLY: inclination angle (°) of optical axis on a cross-section (XZ cross-section) of specific surface (TLY may vary before and after a specific surface)
DCX: deviation amount of optical axis in X-axis direction on cross-section (XZ cross-section) of specific surface Example 1

In a projection see-through device of Example 1, data on an optical surface constituting a light guide member and a projection lens is shown in Table 1. For example, FFS1 means the first surface S11, FFS2 means the second surface S12, and FFS3 means the third surface S13. Furthermore, ASP1 means an emission surface of a first lens of the projection lens, and ASP2 means an incidence surface of the first lens.

TABLE 1

| No | Type | R | T | Nd | Vd |
|---|---|---|---|---|---|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 10.00 | 1.525 | 55.95 |
| 5 | FFS3 | — | −20.00 | 1.525 | 55.95 |
| 6 | FFS4 | — | 10.00 | 1.525 | 55.95 |
| 7 | FFS5 | — | −10.00 | 1.525 | 55.95 |
| 8 | FFS4 | — | −0.50 | | |
| 9 | ASP1 | −6.137 | −6.00 | 1.525 | 55.95 |
| 10 | ASP2 | 6.711 | −0.50 | | |
| 11 | ASP3 | 6.613 | −1.20 | 1.585 | 29.90 |
| 12 | ASP4 | −17.825 | −6.00 | | |
| 13 | ASP5 | −7.024 | −6.00 | 1.525 | 55.95 |
| 14 | ASP6 | 32.129 | −3.91 | | |
| 15 | SPH | ∞ | −1.60 | 1.458 | 67.82 |
| 16 | image surface | | | | |

In regard to the optical surface in the light guide member constituting Example 1, the optical axis inclination angle (tilt) TLY on the cross section and the optical axis deviation amount (decenter) DCX are shown in Table 2. As for the fourth surface S14, the inclination of the angle in a second pass is considered.

TABLE 2

| No | Type | TLY (before surface) | DCX (after surface) | TLY (after surface) |
|---|---|---|---|---|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 23.17 | −44.19 |
| 6 | FFS4 | 53 | 0 | 53 |
| 7 | FFS5 | −35 | 0 | −35 |
| 8 | FFS4 | 0 | 10 | −17.78 |

In regard to each optical surface in the light guide member constituting Example 1, the coefficient $Ak_{m,n}$ in polynomial expression of a free-form surface is shown in Table 3. In Table 3, symbols m and n means variables or degrees in the coefficient $Ak_{m,n}$. A symbol FFSk (where k=1 to 5) means a k-th surface among the first to fifth surfaces S11 to S15 which are free-form surfaces. The coefficient $Ak_{m,n}$ means a coefficient of each term $x^m \cdot y^n$ which constitutes a polynomial expression representing the k-th surface.

TABLE 3

| m | n | FFS1 | FFS2 | FFS3 | FFS4 | FFS5 |
|---|---|---|---|---|---|---|
| 2 | 0 | −6.070E−03 | −1.115E−02 | −5.518E−03 | 7.456E−03 | 7.176E−03 |
| 0 | 2 | −6.428E−03 | −1.033E−02 | −5.843E−03 | −1.928E−02 | −1.403E−02 |
| 3 | 0 | 0.000E+00 | 1.034E−04 | 0.000E+00 | 2.404E−04 | 1.204E−03 |
| 1 | 2 | −2.437E−04 | −8.469E−05 | −2.014E−04 | 7.842E−04 | 2.030E−04 |
| 4 | 0 | 8.234E−07 | −3.110E−06 | 6.185E−07 | 1.602E−05 | 1.512E−04 |
| 2 | 2 | −1.084E−05 | 7.972E−06 | −8.142E−06 | 9.630E−06 | 2.067E−05 |
| 0 | 4 | 3.564E−05 | 1.023E−05 | 2.678E−05 | −1.340E−04 | −2.956E−05 |
| 5 | 0 | 5.154E−08 | −3.707E−08 | 3.520E−08 | −5.360E−07 | 1.381E−05 |
| 3 | 2 | 1.671E−06 | −1.035E−07 | 1.141E−06 | −3.882E−06 | 2.044E−05 |
| 1 | 4 | 0.000E+00 | −5.741E−07 | 0.000E+00 | 4.412E−05 | 4.589E−06 |

TABLE 3-continued

| m | n | FFS1 | FFS2 | FFS3 | FFS4 | FFS5 |
|---|---|---|---|---|---|---|
| 6 | 0 | −7.659E−10 | 2.404E−08 | −4.755E−10 | −6.913E−09 | −1.274E−06 |
| 4 | 2 | −3.089E−08 | −3.373E−09 | −1.918E−08 | −6.764E−07 | −5.177E−07 |
| 2 | 4 | 4.831E−08 | 7.923E−08 | 3.000E−08 | −8.697E−06 | −1.726E−06 |
| 0 | 6 | −5.048E−07 | −1.852E−07 | −3.134E−07 | 5.804E−05 | 3.361E−06 |

In Table 3 and subsequent tables, digits after E in a numerical value mean a decimal exponent, and for example, "−6.070E−03" means $-6.070 \times 10^{-03}$.

Coefficients of an aspheric surface of the optical surface which constitutes the projection lens in the projection see-through device of Example 1 are shown in Table 4.

TABLE 4

|  | ASP1 | ASP2 | ASP3 | ASP4 | ASP5 | ASP6 |
|---|---|---|---|---|---|---|
| K | 0 | 0 | 0 | 0 | 0 | 0 |
| B4 | 1.969E−04 | −2.830E−03 | −2.165E−03 | 4.007E−04 | 7.860E−04 | −7.467E−05 |
| B6 | 5.824E−06 | 1.443E−04 | 7.601E−05 | −1.350E−04 | −1.371E−05 | 9.941E−07 |
| B8 | 3.833E−07 | −4.093E−06 | −4.139E−06 | 7.564E−07 | 2.842E−07 | −2.326E−07 |

In Table 4, symbols K and Bi represent coefficients for specifying aspheric surfaces of aspheric surfaces APS1 to APSE which are lens surfaces of three lenses 31, 32, 33 constituting the projection lens 30. An aspheric surface is specified by the following polynomial expression (aspheric surface expression).

$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R represents a radius of curvature of each surface, h represents the height from the optical axis, K represents a conical coefficient of a target lens surface, and Bi (where i=4, 6, 8, . . . ) represents a high-order aspheric surface coefficient of the target lens surface.

Figure 6:
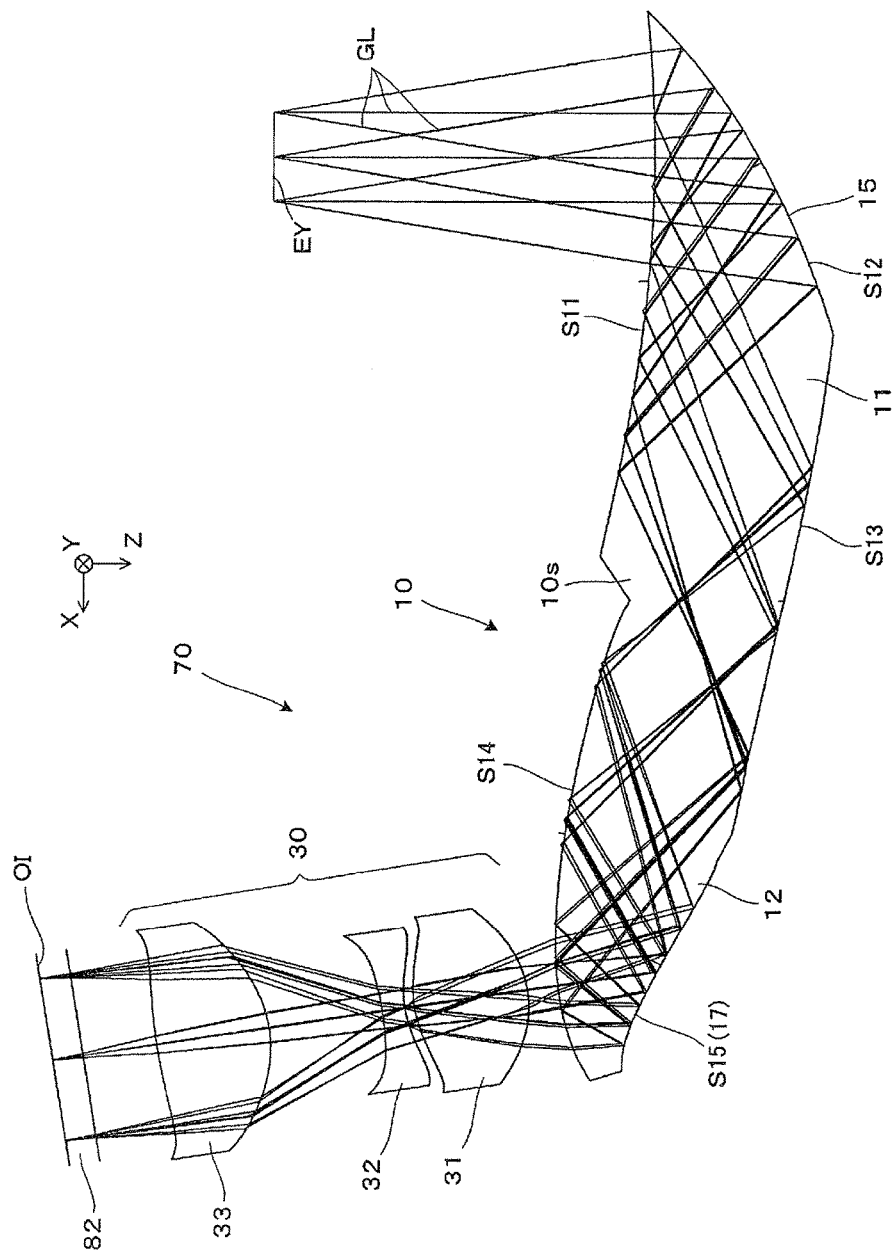
FIG. 6 is a diagram illustrating an optical system of Example 1.

FIG. 6 is a sectional view of the projection see-through device 70 of Example 1. However, a light flux is deviated not only on a reference surface SR but also in the Y direction from the reference surface SR. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively strong positive refractive power, and the fifth surface S15 having comparatively weak negative refractive power. Here, the fourth surface S14 functions as a reflection surface and a refraction surface. Specifically, the fourth surface S14 is a total reflection surface with respect to a light flux (actually, light from the fifth surface S15) reversed from the third surface S13, and is a transmission surface with respect to alight flux (actually, light from the projection lens 30) reversed from the fifth surface S15. That is, the fourth surface S14 has both a function of bending the optical path and a function relating to convergence of a light flux. The projection lens 30 includes a first lens 31 having positive refractive power, a second lens 32 having negative refractive power, and a third lens 33 having positive refractive power. A specific specification of the optical system of Example 1 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm.

Figure 7A:
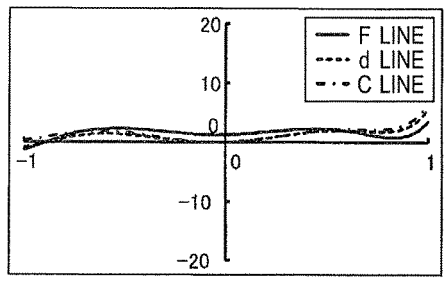
FIGS. 7A, 7B, 7C, 7D, 7E, and 7F are diagrams illustrating aberrations of the optical system of Example 1.
Figure 7D:
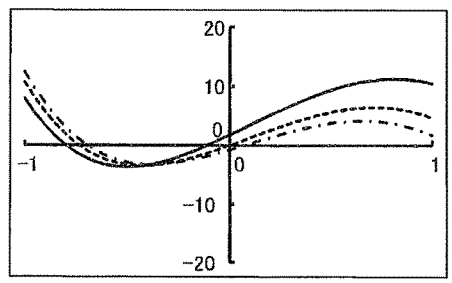
Figure 7B:
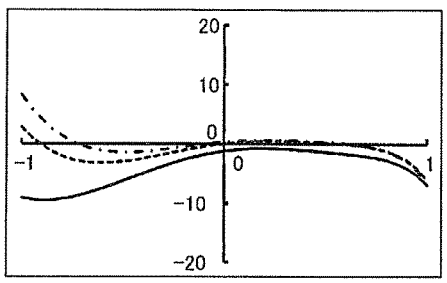
Figure 7E:
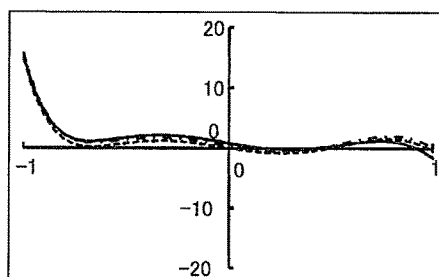
Figure 7C:
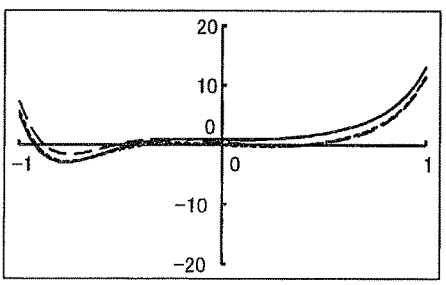
Figure 7F:
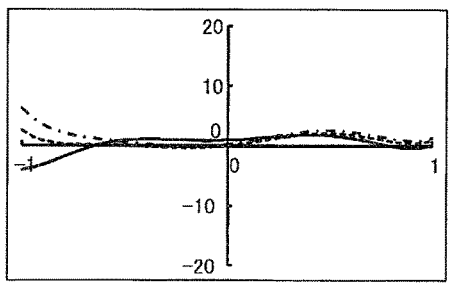
Figure 8A:
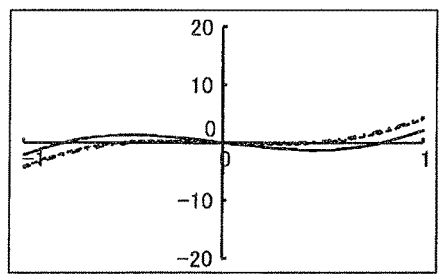
FIGS. 8A, 8B, 8C, 8D, 8E, and 8F are diagrams illustrating aberrations of the optical system of Example 1.
Figure 8D:
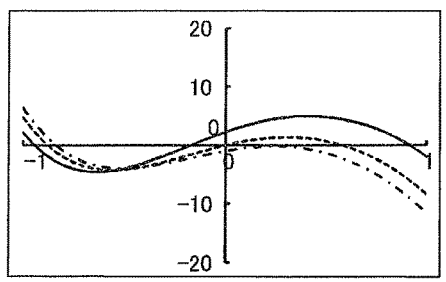
Figure 8B:
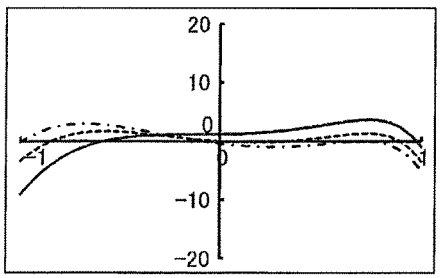
Figure 8E:
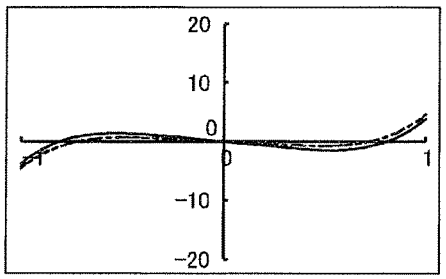
Figure 8C:
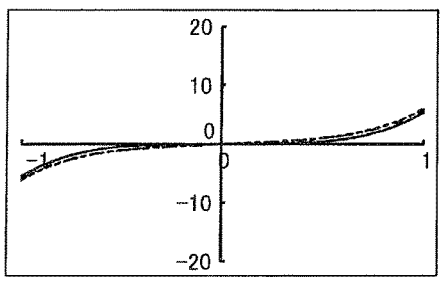
Figure 8F:
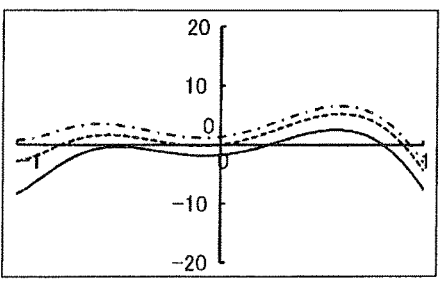

FIGS. 7A to 7F and 8A to 8F show aberration of Example 1. In each aberration diagram, the horizontal axis represents a position in a pupil, and the vertical axis represents the amount of aberration in units of micron. Specifically, FIGS. 7A and 7B show aberration in the Y and X directions at an azimuth of 10° in the X direction and 5.7° in the Y direction, FIGS. 7C and 7D show aberration in the Y and X directions at an azimuth of 0.0° in the X direction and 5.7° in the Y direction, and FIGS. 7E and 7F show aberration in the Y and X directions at an azimuth of −10° in the X direction and 5.7° in the Y direction. FIGS. 8A and 8B show aberration in the Y and X directions at an azimuth of 10° in the X direction and 0.0° in the Y direction, FIGS. 8C and 8D show aberration in the Y and X directions at an azimuth of 0.0° in the X direction and 0.0° in the Y direction, and FIGS. 8E and 8F show aberration in the Y and X directions at an azimuth of −10° in the X direction and 0.0° in the Y direction. The amount of aberration shown in the drawing represents the amount of aberration on the image surface of the video display element when a light beam is reversed for convenience.

Figure 9:
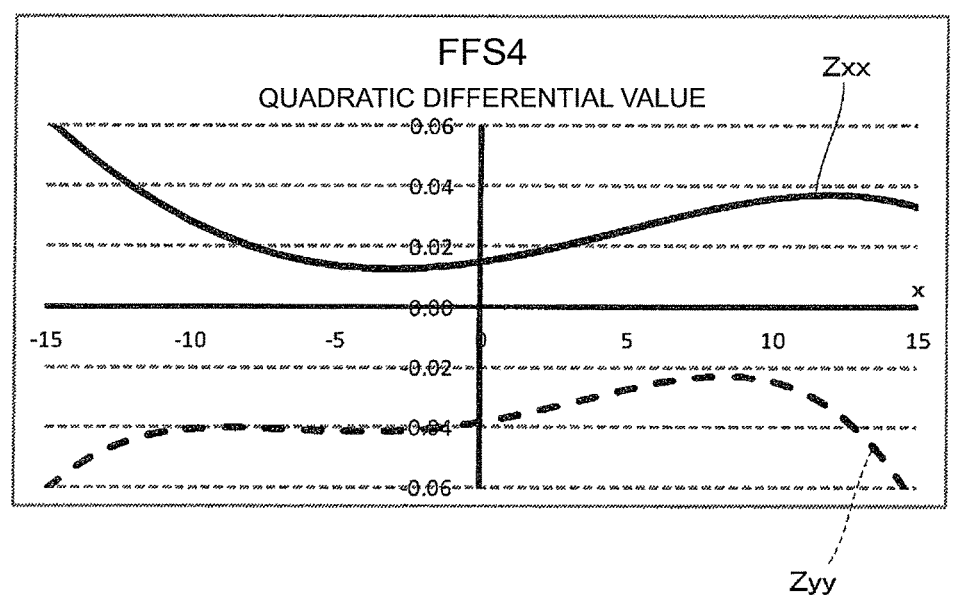
FIG. 9 is a diagram illustrating a quadratic differential value of a curved surface in a local coordinate of a fourth surface according to one embodiment.

FIG. 9 shows quadratic differential values of a curved surface in the local coordinate of the fourth surface S14 of Example 1. That is, a second derivative of a polynomial expression in which the values of Table 3 are assigned to the coefficients in the expression of the shape of the fourth surface S14 expressed by Expression (7) is shown. A solid-line curve Zxx in the drawing is a second derivative in the x direction of the local coordinate, and a broken-line curve Zyy in the drawing is a second derivative in the y direction of the local coordinate. That is, the curve Zxx is a curve of a function obtained by two-stage differentiation in terms of x of the two-variable function of Expression (7), and the curve Zyy is a curve of a function obtained by two-stage partial differentiation in terms of y of the two-variable function of Expression (7). In this case, a value Zxx (0,0) at the origin of the curve Zxx is a quadratic differential value a of x, and a value Zyy (0,0) at the origin of the curve Zyy is a quadratic differential value b of y. As shown in the drawing, in this case, a>0 and b<0. In other words, the shape of the fourth surface S14 expressed by Expression (7) has positive curvature in the x direction and negative curvature in the y direction. Specific numerical values are a=0.0149 (>0) and b=−0.0386 (<0).

Example 2

In a projection see-through device of Example 2, data on an optical surface constituting a light guide member and a projection lens is shown in Table 5.

TABLE 5

| No | Type | R | T | Nd | Vd |
|---|---|---|---|---|---|
| 1 | SPH | ∞ | 22.00 | | |
| 2 | FFS1 | — | 5.50 | 1.525 | 55.95 |
| 3 | FFS2 | — | −5.50 | 1.525 | 55.95 |
| 4 | FFS1 | — | 10.00 | 1.525 | 55.95 |
| 5 | FFS3 | — | −20.00 | 1.525 | 55.95 |
| 6 | FFS4 | — | 14.00 | 1.525 | 55.95 |
| 7 | FFS5 | — | −10.00 | 1.525 | 55.95 |
| 8 | FFS6 | — | −2.00 | | |
| 9 | ASP1 | −20.674 | −7.00 | 1.525 | 55.95 |
| 10 | ASP2 | 9.056 | −0.50 | | |
| 11 | ASP3 | 7.190 | −1.00 | 1.585 | 29.90 |
| 12 | ASP4 | 54.244 | −19.37 | | |
| 13 | ASP5 | −10.384 | −8.15 | 1.525 | 55.95 |
| 14 | ASP6 | −23.928 | −4.98 | | |
| 15 | SPH | ∞ | −1.60 | 1.458 | 67.82 |
| 16 | image surface | | | | |

In regard to the optical surface in the light guide member constituting Example 2, the optical axis inclination angle (tilt) TLY on the cross section and the optical axis deviation amount (decenter) DCX are shown in Table 6.

TABLE 6

| No | Type | TLY (before surface) | DCX (after surface) | TLY (after surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 24.171 | −39.58 |
| 6 | FFS4 | 50 | 0 | 50 |
| 7 | FFS5 | −50 | 0 | −50 |
| 8 | FFS6 | 0 | 0 | 0 |

Figure 10:
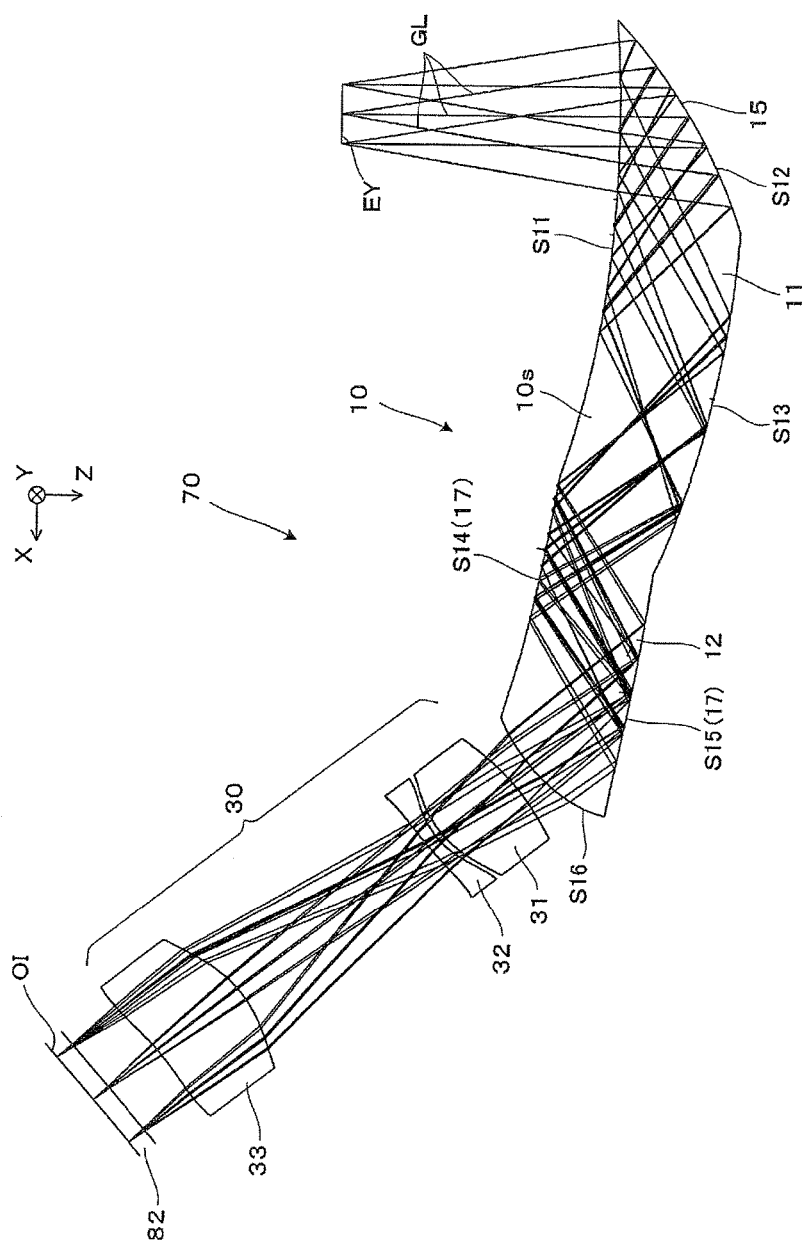
FIG. 10 is a diagram illustrating an optical system of Example 2.

In regard to each optical surface in the light guide member constituting Example 2, the coefficient in polynomial expression of a free-form surface is shown in Table 7. In Table 7, symbols m and n mean variables or degrees in the coefficient $Ak_{m,n}$. A symbol FFSk (where k=1 to 6) means a k-th surface among the first to sixth surfaces S11 to S16 which are free-form surfaces. As shown in FIG. 10, in this example, it is assumed that the light guide member 10 has the sixth surface S16 which is continuously adjacent to the fourth surface S14. As shown in the drawing, the sixth surface S16 is a light incidence surface, and has a function relating to convergence of a light flux. The fourth surface S14 has a function of bending the optical path. That is, in Example 2, the functions in the fourth surface S14 of Example 1 are separated to the fourth surface S14 and the sixth surface S16.

TABLE 7

| m | n | FFS1 | FFS2 | FFS3 | FFS4 | FFS5 | FFS6 |
|---|---|---|---|---|---|---|---|
| 2 | 0 | −4.110E−03 | −1.005E−02 | −3.798E−03 | −3.374E−03 | −2.584E−03 | 3.105E−02 |
| 0 | 2 | −6.261E−03 | −1.022E−02 | −5.949E−03 | −2.723E−02 | 5.720E−03 | 3.039E−02 |
| 3 | 0 | 1.513E−05 | 8.269E−06 | 1.513E−05 | 4.878E−05 | 5.891E−06 | 5.084E−05 |
| 1 | 2 | −8.802E−06 | −4.719E−05 | −8.802E−06 | 1.315E−03 | 1.092E−04 | −4.205E−04 |
| 4 | 0 | −3.283E−07 | −2.484E−06 | −3.283E−07 | 1.997E−05 | 8.630E−06 | 3.586E−05 |
| 2 | 2 | 1.110E−05 | −2.325E−07 | 1.110E−05 | 5.553E−05 | 1.338E−05 | −7.045E−05 |
| 0 | 4 | −1.231E−05 | −3.745E−06 | −1.231E−05 | 1.172E−04 | 4.272E−06 | −6.522E−05 |
| 5 | 0 | −7.697E−08 | 7.994E−08 | −7.697E−08 | −7.495E−07 | 3.889E−07 | 1.241E−05 |
| 3 | 2 | −1.577E−06 | −5.251E−08 | −1.577E−06 | −1.319E−05 | −6.510E−07 | 5.310E−06 |
| 1 | 4 | −1.721E−07 | 6.772E−08 | −1.721E−07 | −2.496E−05 | −1.061E−06 | −1.205E−06 |
| 6 | 0 | 1.800E−09 | 2.414E−09 | 1.800E−09 | −1.502E−06 | 1.016E−09 | 1.206E−06 |
| 4 | 2 | 1.544E−08 | 3.116E−08 | 1.544E−08 | −1.443E−07 | 2.158E−09 | 3.052E−06 |
| 2 | 4 | 2.672E−08 | 7.908E−09 | 2.672E−08 | 1.848E−06 | 7.531E−08 | 2.561E−06 |
| 0 | 6 | 3.158E−07 | 9.774E−10 | 3.158E−07 | 3.779E−06 | 1.021E−07 | 9.437E−07 |

Coefficients of an aspheric surface of the optical surface which constitutes the projection lens in the projection see-through device of Example 2 are shown in Table 8.

TABLE 8

| | ASP1 | ASP2 | ASP3 | ASP4 | ASP5 | ASP6 |
|---|---|---|---|---|---|---|
| K | 0 | 0 | 0 | 0 | 0 | 0 |
| B4 | −2.343E−05 | −2.140E−03 | −6.380E−04 | −1.244E−04 | 2.638E−04 | 1.289E−04 |
| B6 | 1.019E−06 | −6.197E−06 | −1.496E−05 | −6.791E−06 | 7.578E−07 | 9.812E−06 |
| B8 | 5.340E−08 | −9.118E−08 | −1.696E−07 | −2.134E−08 | 1.763E−08 | −1.069E−07 |

In Table 8, symbols K and Bi represent coefficients which specify aspheric surfaces of aspheric surfaces APS1 to APS6 which are lens surfaces of three lenses 31, 32, 33 constituting the projection lens 30.

FIG. 10 is a sectional view of the projection see-through device 70 of Example 2. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having positive refractive power, the second lens 32 having negative refractive power, and the third lens 33 having positive refractive power. A specific specification of the optical system of Example 2 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fifth surface S15.

Figure 11A:
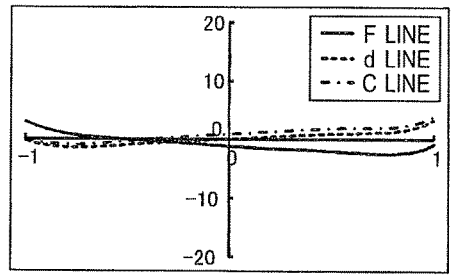
FIGS. 11A, 11B, 11C, 11D, 11E, and 11F are diagrams illustrating aberrations of the optical system of Example 2.
Figure 11B:
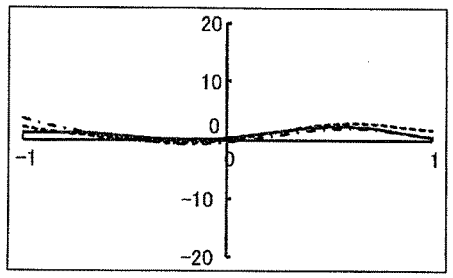
Figure 11C:
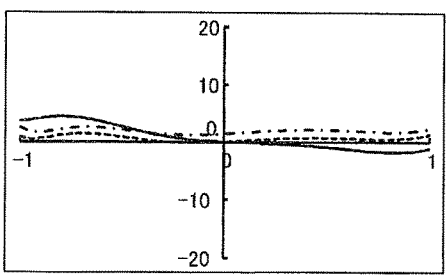
Figure 11D:
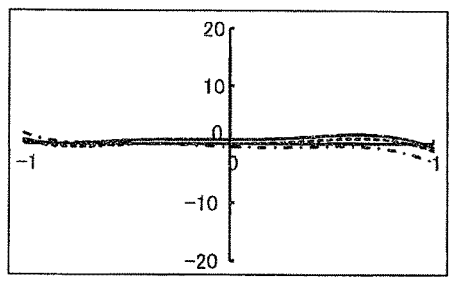
Figure 11E:
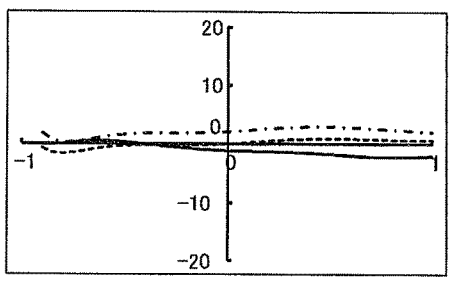
Figure 11F:
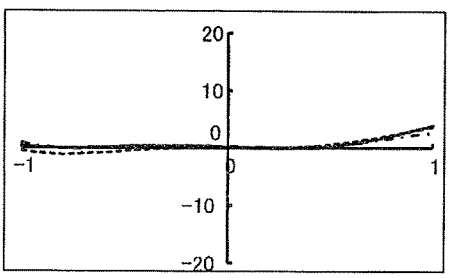
Figure 12A:
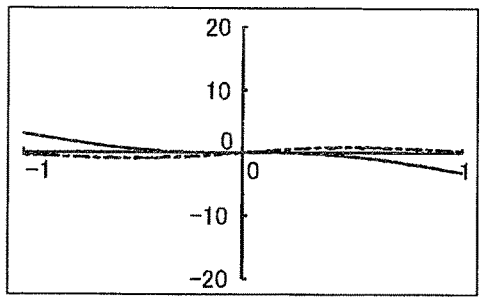
FIGS. 12A to 12F are diagrams illustrating aberrations of the optical system of Example 2.
Figure 12D:
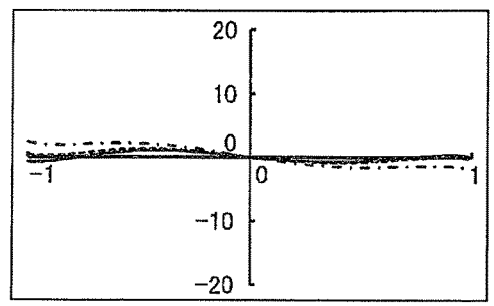
Figure 12B:
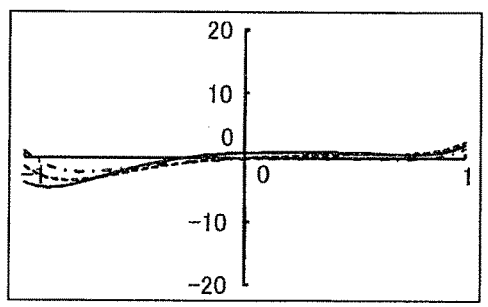
Figure 12E:
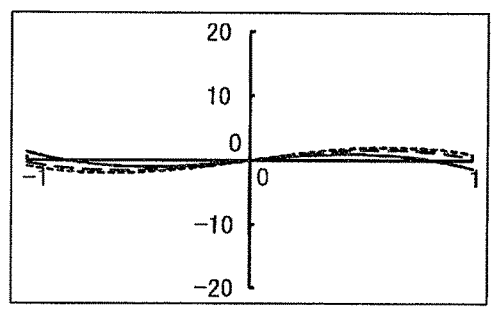
Figure 12C:
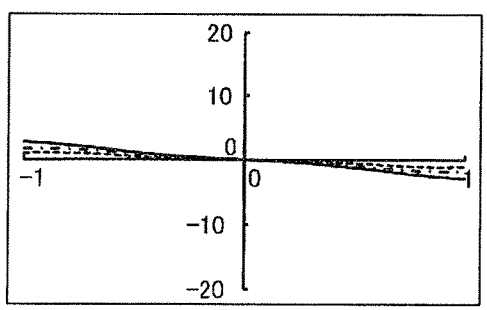
Figure 12F:
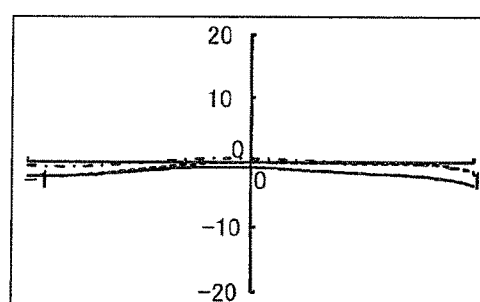

FIGS. 11A to 11F and 12A to 12F show aberration of Example 2. Specifically, FIGS. 11A and 11B show aberration in the Y and X directions at an azimuth of 10° in the X direction and 5.7° in the Y direction, FIGS. 11C and 11D show aberration in the Y and X directions at an azimuth of 0.0° in the X direction and 5.7° in the Y direction, and FIGS. 11E and 11F show aberration in the Y and X directions at an azimuth of −10° in the X direction and 5.7° in the Y direction. FIGS. 12A and 12B show aberration in the Y and X directions at an azimuth of 10° in the X direction and 0.0° in the Y direction, FIGS. 12C and 12D show aberration in the Y and X directions at an azimuth of 0.0° in the X direction and 0.0° in the Y direction, and FIGS. 12E and 12F show aberration in the Y and X directions at an azimuth of −10° in the X direction and 0.0° in the Y direction.

Figure 13:
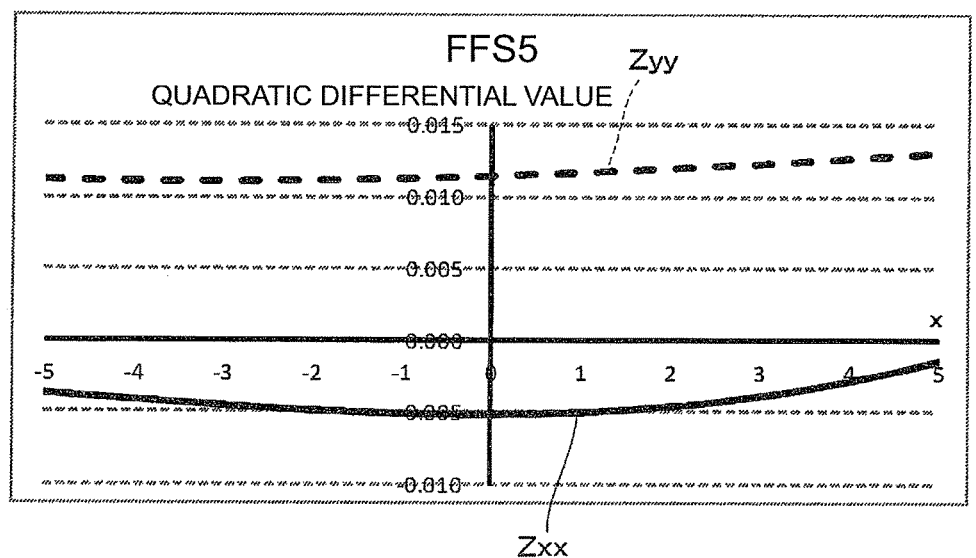
FIG. 13 is a diagram illustrating a quadratic differential value of a curved surface in a local coordinate of a fifth surface according to one embodiment.

FIG. 13 shows quadratic differential values of a curved surface in the local coordinate of the fifth surface S15 of Example 2. That is, a second derivative of a polynomial expression in which the values of Table 7 are assigned to the coefficients in the expression of the shape of the fifth surface S15 expressed by Expression (8) is shown. A solid-line curve Zxx in the drawing is a second derivative in the x direction of the local coordinate, and a broken-line curve Zyy in the drawing is a second derivative in the y direction of the local coordinate. In this case, in regard to the quadratic differential value a which is the value Zxx (0,0) at the origin of Zxx and the quadratic differential value b which is the value Zyy (0,0) at the origin of Zyy, a<0 and b>0. In other words, the shape of the fifth surface S15 expressed by Expression (8) has negative curvature in the x direction and positive curvature in the y direction. Specific numerical values are a=−0.0052 (<0) and b=0.0114 (>0).

Example 3

In a projection see-through device of Example 3, data on an optical surface constituting a light guide member and a projection lens is shown in Table 9.

TABLE 9

| No | Type | R | T | Nd | Vd |
|---|---|---|---|---|---|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 9.00 | 1.525 | 55.95 |
| 5 | FFS3 | — | −17.00 | 1.525 | 55.95 |
| 6 | FFS4 | — | 7.00 | 1.525 | 55.95 |
| 7 | FFS5 | — | 2.00 | 1.525 | 55.95 |
| 8 | ASP1 | 7.697 | 4.00 | 1.525 | 55.95 |
| 9 | ASP2 | −4.907 | 0.50 | | |
| 10 | ASP3 | −5.158 | 1.50 | 1.585 | 29.90 |
| 11 | ASP4 | 5.276 | 2.84 | | |
| 12 | ASP5 | 6.501 | 6.00 | 1.525 | 55.95 |
| 13 | ASP6 | −10.192 | 9.51 | | |
| 14 | SPH | ∞ | 1.60 | 1.458 | 67.82 |
| 15 | image surface | | | | |

In regard to the optical surface in the light guide member constituting Example 3, the optical axis inclination angle (tilt) TLY on the cross section and the optical axis deviation amount (decenter) DCX are shown in Table 10.

TABLE 10

| No | Type | TLY (before surface) | DCX (after surface) | TLY (after surface) |
|---|---|---|---|---|
| 2 | FFS1 | 0 | 0 | 0 |
| 3 | FFS2 | −26 | 0 | 26 |
| 4 | FFS1 | 0 | 0 | 0 |
| 5 | FFS3 | 0 | 19.893504 | −29.394622 |
| 6 | FFS4 | 60 | 0 | 60 |
| 7 | FFS5 | 0 | 0 | 0 |

In regard to each optical surface in the light guide member constituting Example 3, the coefficient in polynomial expression of a free-form surface is shown in Table 11. In Table 11, symbols m and n mean variables or degrees in the coefficient $Ak_{m,n}$. A symbol FFSk (where k=1 to 5) means a k-th surface among the first to fifth surfaces S11 to S15 which are free-form surfaces.

TABLE 11

| m | n | FFS1 | FFS2 | FFS3 | FFS4 | FFS5 |
|---|---|---|---|---|---|---|
| 2 | 0 | −1.254E−02 | −1.211E−02 | −1.191E−02 | −2.323E−03 | −7.675E−02 |
| 0 | 2 | −1.031E−02 | −1.364E−02 | −9.899E−03 | 4.233E−04 | −6.169E−02 |
| 3 | 0 | 5.751E−04 | 1.604E−04 | 5.751E−04 | −3.570E−04 | −1.002E−03 |
| 1 | 2 | 2.984E−05 | 7.274E−05 | 2.984E−05 | 5.402E−04 | 1.477E−03 |
| 4 | 0 | −1.456E−05 | −1.762E−05 | −1.456E−05 | 1.163E−04 | −1.143E−03 |
| 2 | 2 | 3.029E−05 | 1.938E−06 | 3.029E−05 | −1.986E−04 | −3.046E−03 |
| 0 | 4 | 5.757E−06 | 3.553E−06 | 5.757E−06 | 2.752E−04 | −1.033E−03 |
| 5 | 0 | −2.015E−07 | 1.015E−06 | −2.015E−07 | 4.365E−08 | 8.729E−05 |
| 3 | 2 | −2.008E−06 | −5.253E−07 | −2.008E−06 | 6.700E−06 | −1.739E−05 |
| 1 | 4 | 2.748E−06 | 6.960E−07 | 2.748E−06 | −6.458E−05 | −2.971E−05 |

TABLE 11-continued

| m | n | FFS1 | FFS2 | FFS3 | FFS4 | FFS5 |
|---|---|---|---|---|---|---|
| 6 | 0 | 6.781E−09 | −3.238E−08 | 6.781E−09 | −1.541E−06 | 7.581E−05 |
| 4 | 2 | 7.881E−08 | 4.590E−08 | 7.881E−08 | 8.640E−07 | 2.208E−04 |
| 2 | 4 | −1.309E−07 | −6.944E−08 | −1.309E−07 | 2.069E−05 | 2.278E−04 |
| 0 | 6 | −4.681E−07 | −1.134E−07 | −4.681E−07 | −2.282E−06 | 6.185E−05 |

Coefficients of an aspheric surface of the optical surface which constitutes the projection lens in the projection see-through device of Example 3 are shown in Table 12.

TABLE 12

|   | ASP1 | ASP2 | ASP3 | ASP4 | ASP5 | ASP6 |
|---|---|---|---|---|---|---|
| K | 0 | 0 | 0 | 0 | 0 | 0 |
| B4 | −2.434E−03 | 2.595E−03 | 2.499E−03 | −5.821E−03 | −1.978E−03 | 2.139E−04 |
| B6 | 3.219E−05 | −4.997E−05 | 7.246E−05 | 2.617E−04 | 1.853E−05 | −5.137E−06 |
| B8 | 2.641E−06 | 5.850E−06 | −1.484E−06 | −8.002E−06 | −6.175E−07 | −1.059E−07 |

In Table 12, symbols K and Bi represent coefficients for specifying aspheric surfaces of aspheric surfaces APS1 to APS6 which are lens surfaces of three lenses 31, 32, 33 constituting the projection lens 30.

Figure 14:
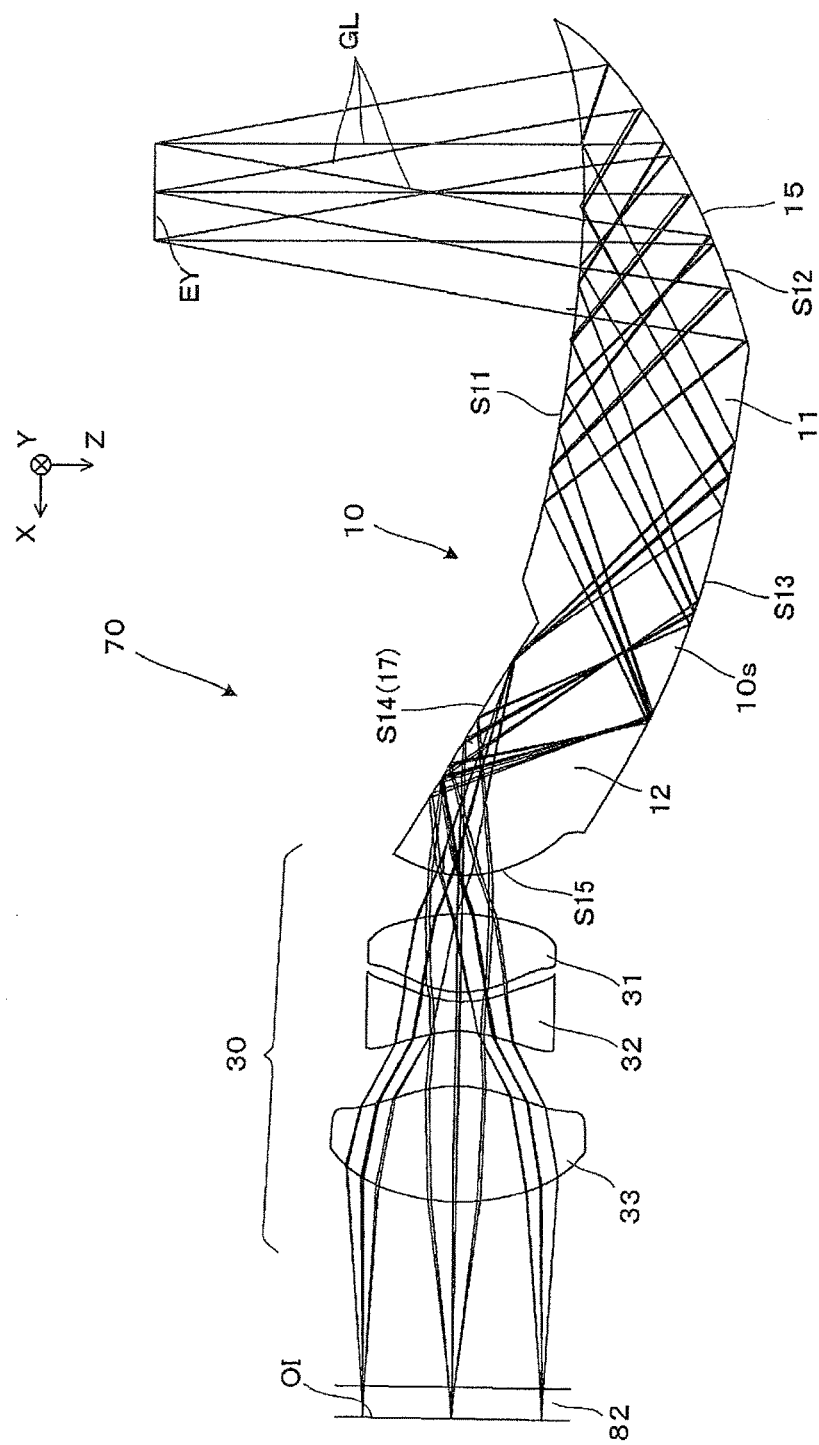
FIG. 14 is a diagram illustrating an optical system of Example 3.

FIG. 14 is a sectional view of the projection see-through device 70 of Example 3. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, and the fifth surface S15 having comparatively strong positive refractive power. Here, the fifth surface S15 has the function (the function of the sixth surface S16 of Example 2) of a part of the fourth surface S14 of Example 1 relating to convergence of a light flux. That is, Example 3 of FIG. 14 may be considered as a case where the fifth surface S15 among the first to fifth surfaces S11 to S15 of Example 1 shown in FIG. 6 is omitted. The projection lens 30 has the first lens 31 having positive refractive power, the second lens 32 having negative refractive power, and the third lens 33 having positive refractive power. A specific specification of the optical system of Example 3 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fourth surface S14.

Figure 15A:
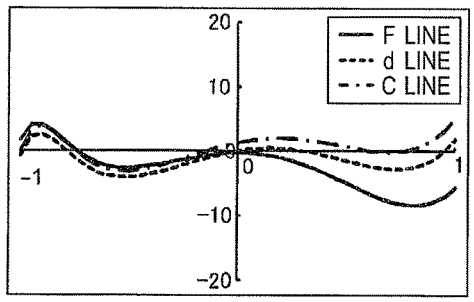
FIGS. 15A, 15B, 15C, 15D, 15E, and 15F are diagrams illustrating aberrations of the optical system of Example 3.
Figure 15D:
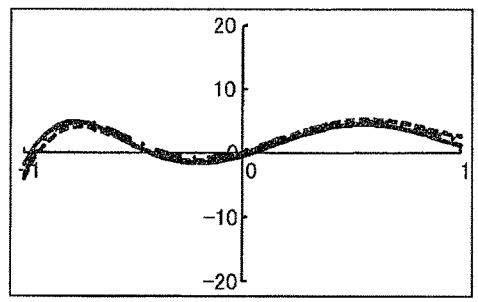
Figure 15B:
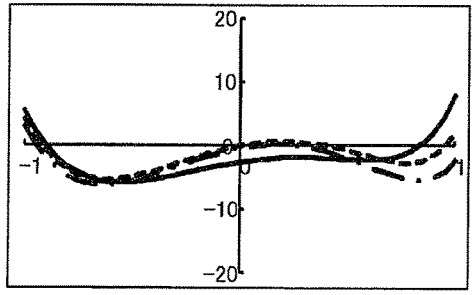
Figure 15E:
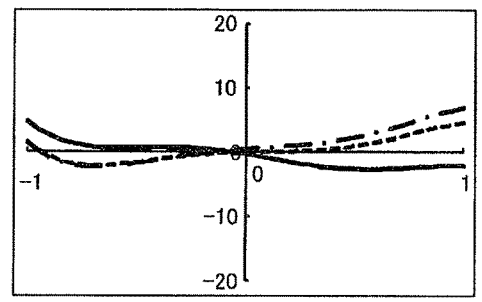
Figure 15C:
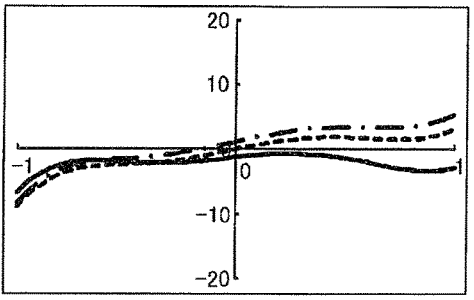
Figure 15F:
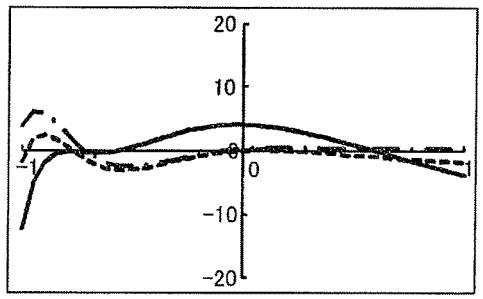
Figure 16A:
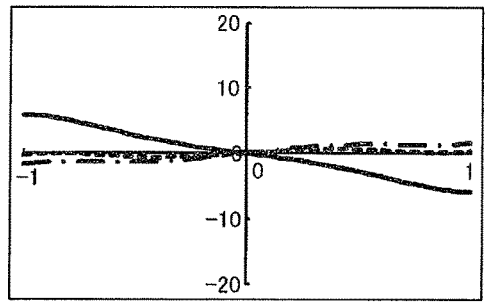
FIGS. 16A, 16B, 16C, 16D, 16E, 16F are diagrams illustrating aberrations of the optical system of Example 3.
Figure 16B:
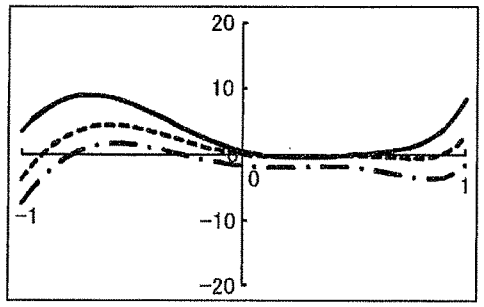
Figure 16C:
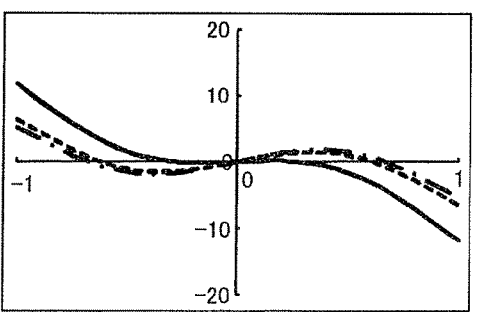
Figure 16D:
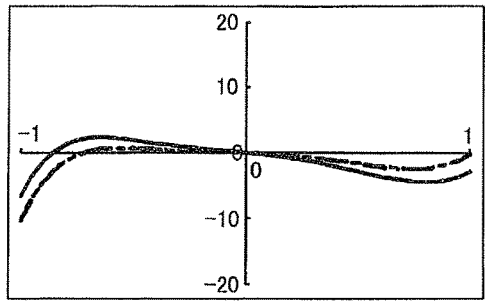
Figure 16E:
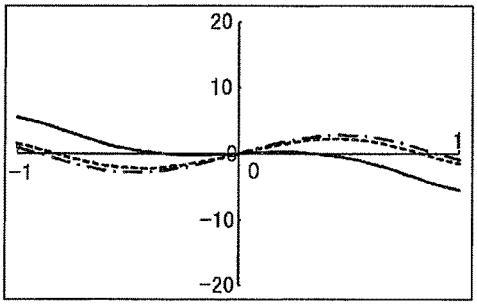
Figure 16F:
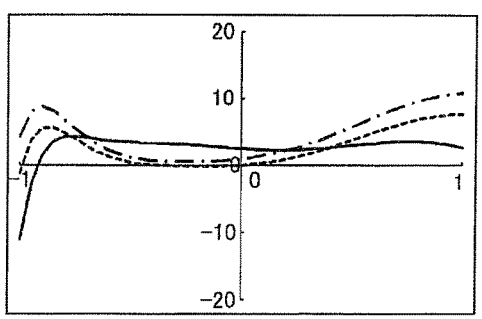

FIGS. 15A to 15F and 16A to 16F show aberration of Example 3. Specifically, FIGS. 15A and 15B show aberration in the Y and X directions at an azimuth of 10° in the X direction and 5.7° in the Y direction, FIGS. 15C and 15D show aberration in the Y and X directions at an azimuth of 0.0° in the X direction and 5.7° in the Y direction, and FIGS. 15E and 15F show aberration in the Y and X directions at an azimuth of −10° in the X direction and 5.7° in the Y direction. FIGS. 16A and 16B show aberration in the Y and X directions at an azimuth of 10° in the X direction and 0.0° in the Y direction, FIGS. 16C and 16D show aberration in the Y and X directions at an azimuth of 0.0° in the X direction and 0.0° in the Y direction, and FIGS. 16E and 16F show aberration in the Y and X directions at an azimuth of −10° in the X direction and 0.0° in the Y direction.

Figure 17:
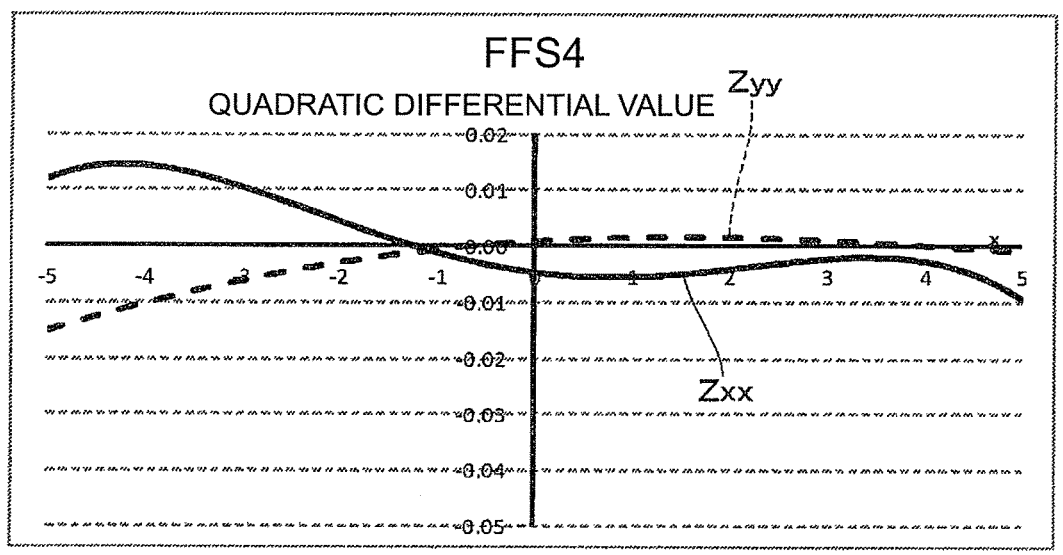
FIG. 17 is a diagram illustrating a quadratic differential value of a curved surface in a local coordinate of a fourth surface according to one embodiment.

FIG. 17 shows quadratic differential values of a curved surface in the local coordinate of the fourth surface S14 of Example 3. That is, a second derivative of a polynomial expression in which the values of Table 11 are assigned to the coefficients in the expression of the shape of the fourth surface S14 expressed by Expression (7) is shown. A solid-line curve Zxx in the drawing is a second derivative in the x direction of the local coordinate, and a broken-line curve Zyy in the drawing is a second derivative in the y direction of the local coordinate. In this case, in regard to the quadratic differential value a which is the value Zxx (0,0) at the origin of Zxx and the quadratic differential value b which is the value Zyy (0,0) at the origin of Zyy, a<0 and b>0. In other words, the shape of the fourth surface S14 expressed by Expression (7) has negative curvature in the x direction and positive curvature in the y direction. Specific numerical values are a=−0.0046 (<0) and b=0.0008 (>0).

Example 4

In a projection see-through device of Example 4, data on an optical surface constituting a light guide member and a projection lens is shown in Table 13.

TABLE 13

| No | Type | R | T | Nd | Vd |
|---|---|---|---|---|---|
| 1 | SPH | ∞ | 20.00 | | |
| 2 | flat surface | ∞ | 5.80 | 1.525 | 55.95 |
| 3 | FFS1 | — | −5.80 | 1.525 | 55.95 |
| 4 | flat surface | ∞ | 10.00 | 1.525 | 55.95 |
| 5 | flat surface | ∞ | −22.70 | 1.525 | 55.95 |
| 6 | FFS2 | — | 11.90 | 1.525 | 55.95 |
| 7 | FFS3 | — | −11.90 | 1.525 | 55.95 |
| 8 | FFS2 | — | −3.20 | | |
| 9 | FFS4 | — | −6.00 | 1.525 | 55.95 |
| 10 | ASP1 | 11.067 | −1.29 | | |
| 11 | ASP2 | 9.431 | −1.50 | 1.585 | 29.90 |
| 12 | ASP3 | −61.649 | −6.75 | | |
| 13 | ASP4 | −16.964 | −5.50 | 1.525 | 55.95 |
| 14 | ASP5 | 12.848 | −3.00 | | |
| 15 | SPH | ∞ | −1.60 | 1.458 | 67.82 |
| 16 | image surface | | | | |

In regard to the optical surface in the light guide member constituting Example 4, the optical axis inclination angle (tilt) TLY on the cross section and the optical axis deviation amount (decenter) DCX are shown in Table 14.

TABLE 14

| No | Type | TLY (before surface) | DCX (after surface) | TLY (after surface) |
|---|---|---|---|---|
| 2 | flat surface | 6 | 0 | −6 |
| 3 | FFS1 | −23.8 | 0 | 23.8 |
| 4 | flat surface | 6 | 0 | −6 |
| 5 | flat surface | 6 | 21.1 | −55.25 |
| 6 | FFS2 | 57 | 0 | 57 |
| 7 | FFS3 | −33.06 | 0 | 33.06 |
| 8 | FFS2 | −57 | 11.04 | −11.75 |

In regard to each optical surface in the light guide member constituting Example 4, the coefficient in polynomial expression of a free-form surface is shown in Table 15. Among the first to fifth surfaces S11 to S15, the first surface S11 and the third surface S13 are flat surfaces and are in parallel with each other. A lens surface 31a (see FIG. 18) of the first lens 31 among the lenses constituting the projection lens 30 is an aspheric surface (non-axisymmetric aspheric surface) asymmetrical to the optical axis. In Table 15, symbols m and n mean variables or degrees in the coefficient $Ak_{m,n}$. A symbol FFSk (where k=1 to 4) means the second surface S12, the fourth surface S14, and the fifth surface S15 which are free-form surfaces, not flat surfaces, among the first to fifth surfaces S11 to S15, and the lens surface 31a of the first lens 31. That is, a symbol FFS1 corresponds to the second surface S12, a symbol FFS2 corresponds to the fourth surface S14, a symbol FFS3 corresponds to the fifth surface S15, and a symbol FFS4 corresponds to the lens surface 31a.

TABLE 15

| m | n | FFS1 | FFS2 | FFS3 | FFS4 |
|---|---|---|---|---|---|
| 2 | 0 | −8.000E−03 | 1.281E−03 | −1.232E−02 | 3.377E−02 |
| 0 | 2 | −7.104E−03 | −2.261E−02 | −1.810E−02 | −5.713E−02 |
| 3 | 0 | −7.472E−06 | 1.253E−04 | 5.624E−06 | 4.621E−03 |
| 1 | 2 | −3.912E−05 | 4.613E−04 | −9.222E−06 | 1.954E−03 |
| 4 | 0 | 7.734E−07 | −1.083E−06 | 5.367E−06 | −1.747E−04 |
| 2 | 2 | 1.827E−07 | −2.670E−06 | 1.341E−05 | 5.794E−05 |
| 0 | 4 | −3.075E−07 | 1.216E−04 | 9.966E−07 | 5.078E−05 |
| 5 | 0 | −2.648E−08 | 5.502E−08 | 5.965E−07 | −4.209E−05 |
| 3 | 2 | −4.661E−08 | −1.212E−06 | 7.145E−07 | −1.351E−05 |
| 1 | 4 | −7.936E−09 | −7.680E−06 | 5.860E−07 | −5.436E−06 |
| 6 | 0 | −5.229E−09 | 2.269E−09 | 2.790E−08 | 2.173E−06 |
| 4 | 2 | −1.021E−08 | 3.050E−08 | 3.560E−08 | 3.457E−06 |
| 2 | 4 | −4.325E−09 | 3.383E−07 | 3.763E−08 | 3.162E−06 |
| 0 | 6 | 1.946E−09 | 1.015E−07 | 9.005E−08 | 2.207E−06 |

Coefficients of an aspheric surface of the optical surface which constitutes the projection lens in the projection see-through device of Example 4 are shown in Table 16.

TABLE 16

|  | ASP1 | ASP2 | ASP3 | ASP4 | ASP5 |
|---|---|---|---|---|---|
| K | −1 | −1 | −1 | −1 | −1 |
| B4 | −2.302E−04 | −1.562E−03 | −1.273E−03 | 1.885E−04 | 3.482E−04 |
| B6 | −4.106E−06 | 6.061E−06 | −4.546E−06 | 3.211E−06 | 4.031E−07 |
| B8 | 1.065E−07 | 1.246E−07 | −1.173E−07 | 3.480E−08 | 2.487E−08 |

In Table 16, symbols K and Bi represent coefficients for specifying aspheric surfaces of aspheric surfaces APS1 to APS5 which are lens surfaces excluding the first lens surface 31a, which is the first lens surface of the lens 31, that is, the surface of the symbol FFS4 among the lens surfaces of the three lenses 31, 32, and 33 constituting the projection lens 30.

Figure 18:
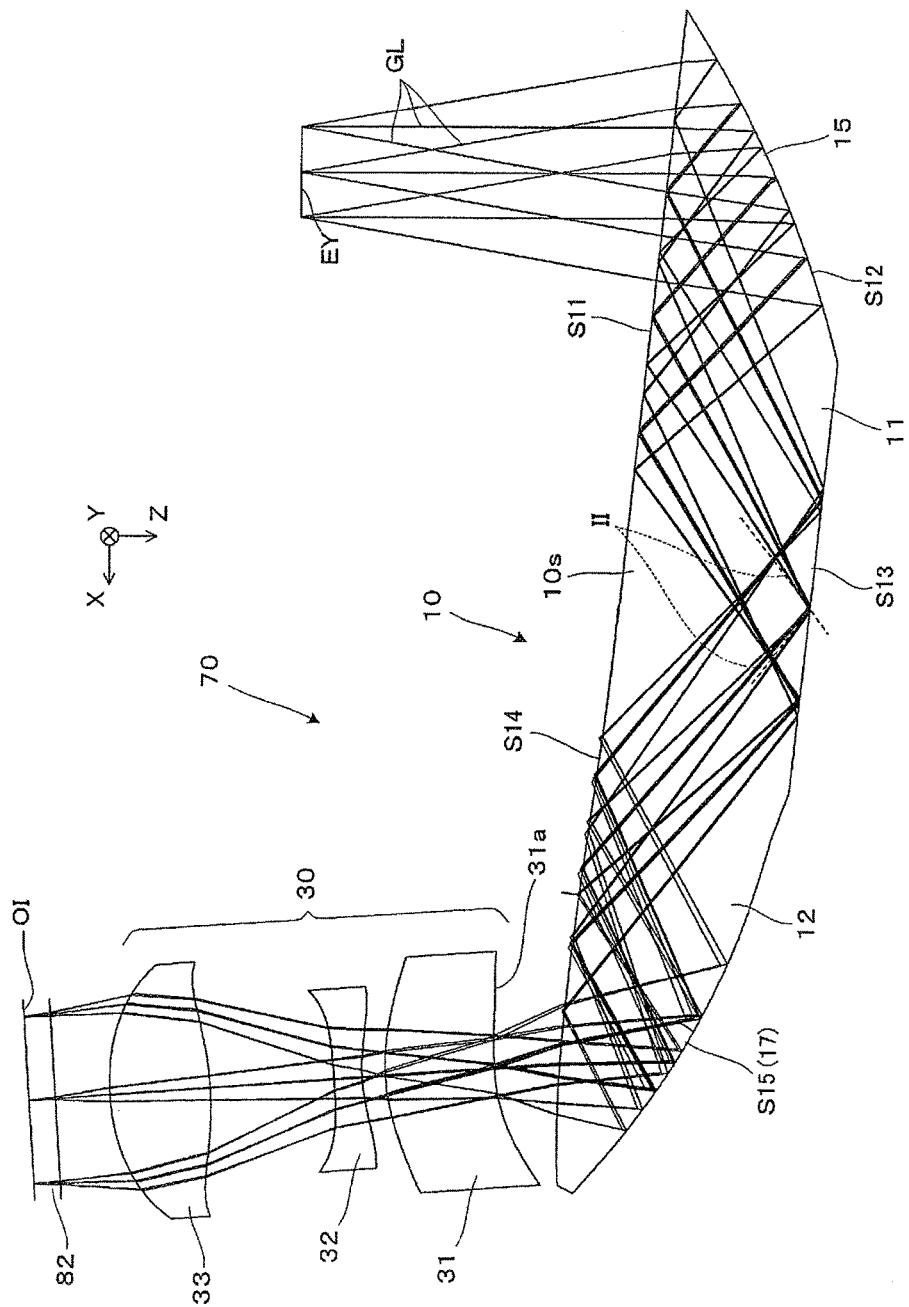
FIG. 18 is a diagram illustrating an optical system of Example 4.

FIG. 18 is a sectional view of the projection see-through device 70 of Example 4. In the projection see-through device 70, the light guide member 10 includes the first surface S11 having no refractive power, the second surface S12 having comparatively strong positive refractive power, the third surface S13 having no refractive power, the fourth surface S14 having comparatively weak positive refractive power, and the fifth surface S15 having comparatively strong positive refractive power. The projection lens 30 includes the first lens 31 having positive refractive power, the second lens 32 having negative refractive power, and the third lens 33 having positive refractive power. As described above, the lens surface 31a of the first lens 31 is an aspheric surface (non-axisymmetric aspheric surface) asymmetrical to the optical axis. In this case, in addition to the light guide member 10, a function of correcting non-axisymmetric aberration may be provided in the projection lens 30. A specific specification of the optical system of Example 4 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this case, the first surface S11 and the third surface S13 arranged to face each other have parallel flat shapes, and thus, when the observer views an external scene through the first surface S11 and the third surface S13, diopter can be completely 0.

Figure 19A:
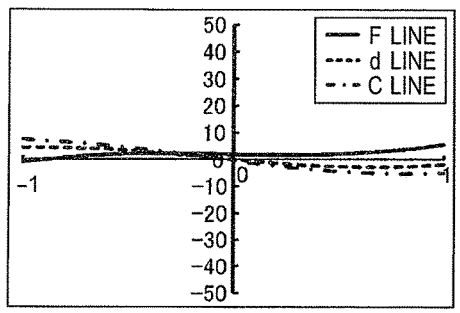
FIGS. 19A, 19B, 19C, 19D, 19E, and 19F are diagrams illustrating aberration of the optical system of Example 4.
Figure 19D:
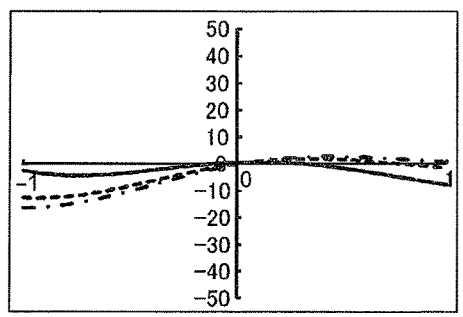
Figure 19B:
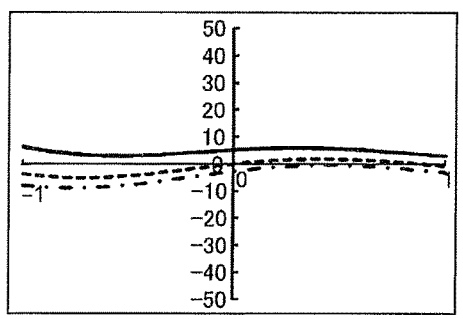
Figure 19E:
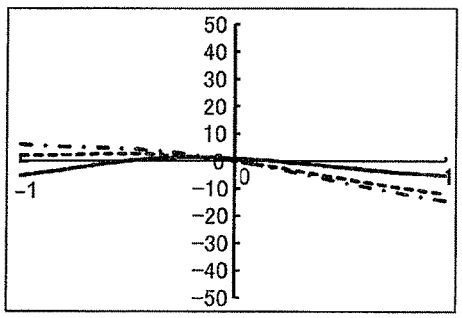
Figure 19C:
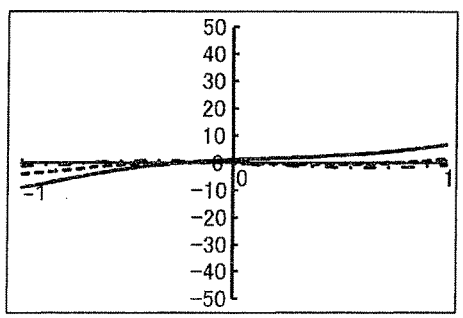
Figure 19F:
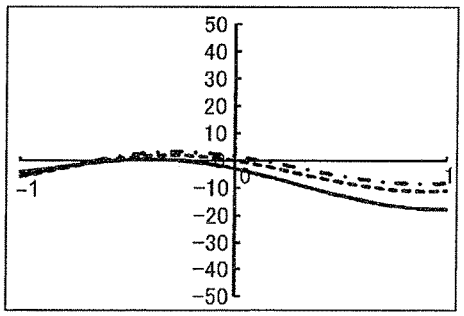
Figure 20A:
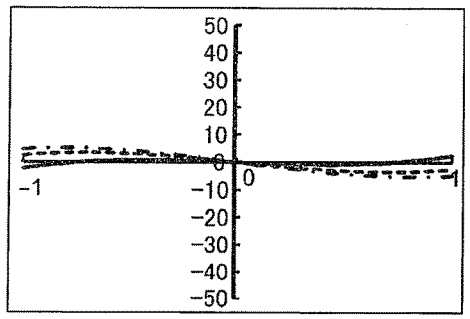
FIGS. 20A, 20B, 20C, 20D, 20E, and 20F are diagrams illustrating aberration of the optical system of Example 4.
Figure 20D:
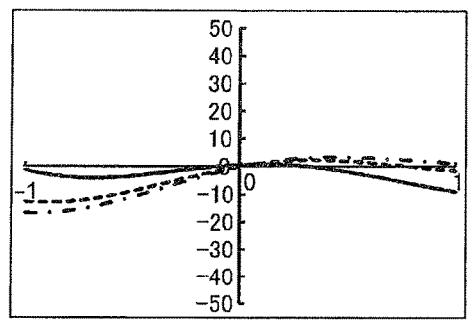
Figure 20B:
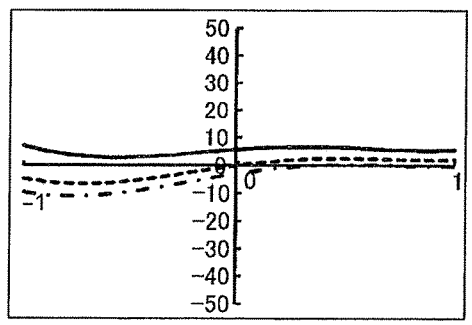
Figure 20E:
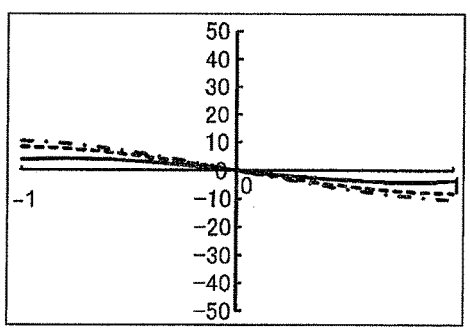
Figure 20C:
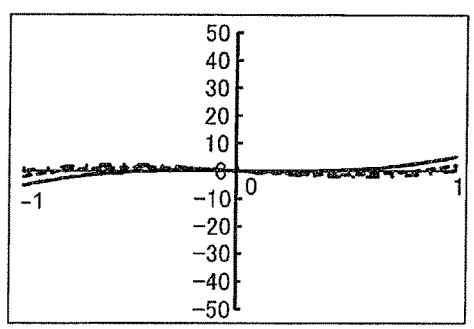
Figure 20F:
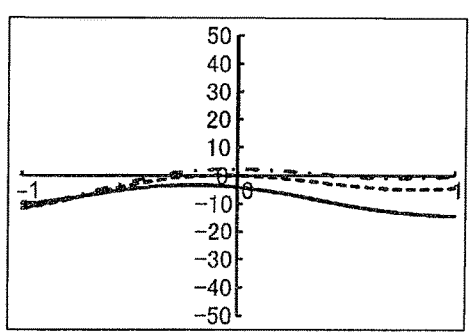

FIGS. 19A to 19F and 20A to 20F show aberration of Example 4. Specifically, FIGS. 19A and 19B show aberration in the Y and X directions at an azimuth of 10° in the X direction and 5.7° in the Y direction, FIGS. 19C and 19D show aberration in the Y and X directions at an azimuth of 0.0° in the X direction and 5.7° in the Y direction, and FIGS. 19E and 19F show aberration in the Y and X directions at an azimuth of −10° in the X direction and 5.7° in the Y direction. FIGS. 20A and 20B show aberration in the Y and X directions at an azimuth of 10° in the X direction and 0.0° in the Y direction, FIGS. 20C and 20D show aberration in the Y and X directions at an azimuth of 0.0° in the X direction and 0.0° in the Y direction, and FIGS. 20E and 20F show aberration in the Y and X directions at an azimuth of −10° in the X direction and 0.0° in the Y direction.

Figure 21A:
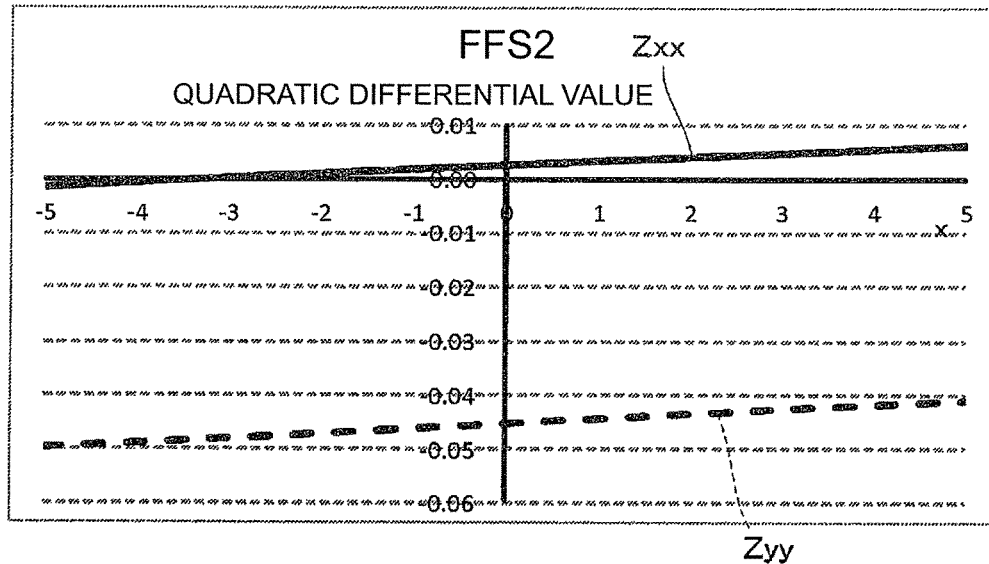
FIG. 21A is a diagram illustrating a quadratic differential value of a curved surface in a local coordinate of a fourth surface according to one embodiment.

FIG. 21A shows quadratic differential values of a curved surface in the local coordinate of the fourth surface S14 of Example 4. That is, a second derivative of a polynomial expression in which the values of Table 15 are assigned to the coefficients in the expression of the shape of the fourth surface S14 expressed by Expression (7) is shown. A solid-line curve Zxx in the drawing is a second derivative in the x direction of the local coordinate, and a broken-line curve Zyy in the drawing is a second derivative in the y direction of the local coordinate. In this case, in regard to the quadratic differential value a which is the value Zxx (0,0) at the origin of Zxx and the quadratic differential value b which is the value Zyy (0,0) at the origin of Zyy, a>0 and b<0. In other words, the shape of the fourth surface S14 expressed by Expression (7) has negative curvature in the x direction and positive curvature in the y direction. Specific numerical values are a=0.0026 (>0) and b=−0.0452 (<0).

Figure 21B:
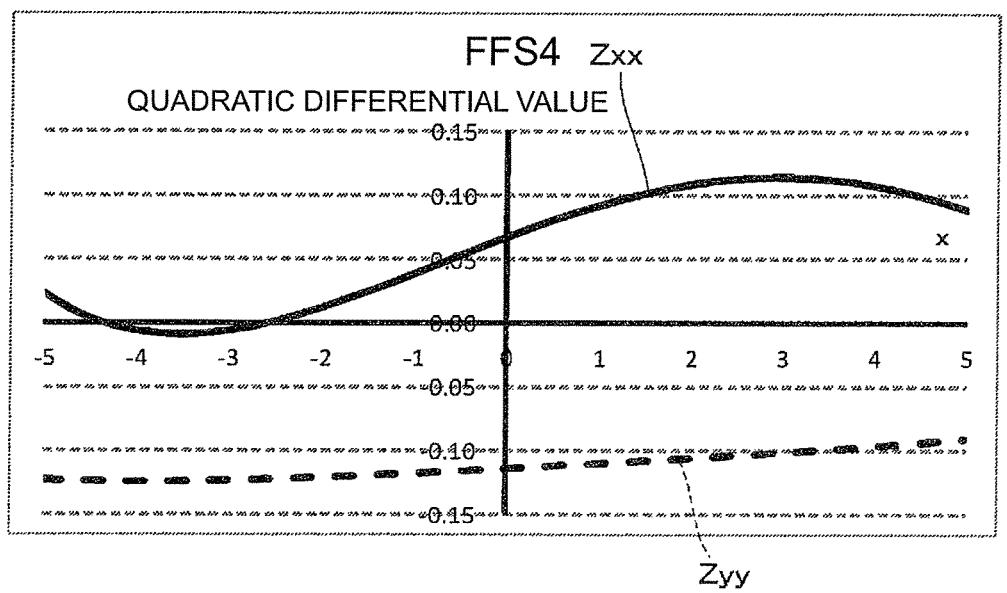
FIG. 21B is a diagram illustrating a quadratic differential value of a curved surface in a local coordinate of an aspheric lens surface asymmetrical to an optical axis.

In Example 4, the lens surface 31a, that is, the surface of the symbol FFS4 is an opposite-sign curvature curved surface. FIG. 21B shows quadratic differential values of a curved surface in the local coordinate of the lens surface 31a of Example 4. That is, a second derivative of a polynomial expression in which the values of Table 15 are assigned to the coefficients in the expression of the shape of the lens surface 31a expressed by Expression (7) is shown. A solid-line curve Zxx in the drawing is a second derivative in the x direction of the local coordinate, and a broken-line curve Zyy in the drawing is a second derivative in the y direction of the local coordinate. In this case, in regard to the quadratic differential value a which is the value Zxx (0,0) at the origin of Zxx and the quadratic differential value b which is the value Zyy (0,0) at the origin of Zyy, a>0 and b<0. In other words, the shape of the fourth surface S14 expressed by Expression (7) has negative curvature in the x direction and positive curvature in the y direction. Specific numerical values are a=0.0675 (>0) and b=−0.1143 (<0).

Example 5

In a projection see-through device of Example 5, data on an optical surface constituting a light guide member and a projection lens is shown in Table 17.

TABLE 17

| No | Type | R | T | Nd | Vd |
|---|---|---|---|---|---|
| 1 | SPH | ∞ | 20.00 | | |
| 2 | FFS1 | — | 5.00 | 1.525 | 55.95 |
| 3 | FFS2 | — | −5.00 | 1.525 | 55.95 |
| 4 | FFS1 | — | 8.50 | 1.525 | 55.95 |
| 5 | FFS3 | — | −12.00 | 1.525 | 55.95 |
| 6 | FFS4 | — | 9.00 | 1.525 | 55.95 |
| 7 | FFS5 | — | −6.20 | 1.525 | 55.95 |
| 8 | FFS6 | — | −2.00 | | |
| 9 | ASP1 | −46.932 | −1.50 | 1.585 | 29.90 |
| 10 | FFS7 | — | −3.23 | | |
| 11 | ASP2 | −6.165 | −4.00 | 1.525 | 55.95 |
| 12 | ASP3 | −19.763 | −3.00 | | |
| 13 | SPH | ∞ | −1.44 | 1.458 | 67.82 |
| 14 | image surface | ∞ | | | |

In regard to the optical surface in the light guide member constituting Example 5, the optical axis inclination angle (tilt) TLY on the cross section and the optical axis deviation amount (decenter) DCX are shown in Table 18.

TABLE 18

| No | Type | TLY (before surface) | DCX (after surface) | TLY (after surface) |
|---|---|---|---|---|
| 2 | FFS1 | 0.00 | 0.0 | 0.00 |
| 3 | FFS2 | −24.00 | 0.0 | 24.00 |
| 4 | FFS1 | 0.00 | 0.0 | 0.00 |
| 5 | FFS3 | 0.00 | 15.361 | −5.87 |
| 6 | FFS4 | 35.00 | 0.0 | 35.00 |
| 7 | FFS5 | −37.00 | 0.0 | −37.00 |
| 8 | FFS6 | 0.00 | 0.0 | 0.00 |

In regard to each optical surface in the light guide member constituting Example 5, the coefficient in polynomial expression of a free-form surface is shown in Table 19. In Table 19, symbols m and n mean variables or degrees in the coefficient $Ak_{m,n}$. A symbol FFSk (where k=1 to 6) means a k-th surface among the first to sixth surfaces S11 to S16 which are free-form surfaces. A symbol FFS7 corresponds to a second lens surface (see FIG. 22) which is another lens surface of the first lens 31 among two lenses 31 and 32 constituting the projection lens 30. The lens surface 31b is an aspheric surface asymmetrical to the optical axis. In Tables 13 and 14, symbols m and n mean variables or degrees in the coefficient $Ak_{m,n}$.

TABLE 19

| m | n | FFS1 | FFS2 | FFS3 | FFS4 |
|---|---|---|---|---|---|
| 2 | 0 | −9.590E−03 | −1.493E−02 | −9.015E−03 | 1.106E−02 |
| 0 | 2 | −3.895E−02 | −1.718E−02 | −3.174E−02 | −4.225E−02 |
| 3 | 0 | −3.944E−05 | 1.514E−04 | −3.155E−05 | −1.006E−03 |
| 1 | 2 | 7.919E−05 | −5.479E−04 | 6.335E−05 | −1.529E−03 |
| 4 | 0 | 1.802E−05 | −9.117E−06 | −1.873E−05 | 6.325E−05 |
| 2 | 2 | −1.154E−04 | −1.375E−06 | 2.347E−05 | −1.241E−04 |
| 0 | 4 | 2.027E−06 | −8.306E−06 | −3.121E−05 | 3.387E−04 |
| 5 | 0 | −1.163E−06 | 6.691E−07 | 1.423E−07 | 1.841E−05 |
| 3 | 2 | 3.615E−07 | −9.426E−07 | −3.074E−06 | 7.113E−06 |
| 1 | 4 | −8.107E−06 | −3.125E−07 | 2.872E−06 | 8.646E−05 |
| 6 | 0 | 5.687E−08 | −1.366E−06 | 6.812E−09 | −5.296E−06 |
| 4 | 2 | −8.370E−08 | 2.463E−08 | 1.030E−08 | −1.413E−07 |
| 2 | 4 | −5.216E−07 | −2.612E−08 | −2.164E−07 | 1.999E−05 |
| 0 | 6 | 4.183E−08 | −6.074E−08 | −4.753E−08 | −3.325E−06 |

| m | n | FFS5 | FFS6 | FFS7 |
|---|---|---|---|---|
| 2 | 0 | −2.012E−02 | 4.113E−03 | −4.696E−02 |
| 0 | 2 | −2.602E−02 | 1.450E−01 | 8.928E−02 |
| 3 | 0 | 1.762E−04 | −6.809E−03 | 1.596E−03 |
| 1 | 2 | 3.957E−04 | 4.988E−03 | 5.628E−03 |
| 4 | 0 | 4.907E−07 | −2.072E−04 | −1.046E−04 |
| 2 | 2 | 1.606E−05 | 7.518E−04 | −2.569E−04 |
| 0 | 4 | 1.968E−04 | −4.126E−03 | 4.836E−03 |
| 5 | 0 | 6.181E−07 | 2.409E−05 | 5.063E−05 |
| 3 | 2 | −2.044E−06 | −2.596E−05 | −2.063E−04 |
| 1 | 4 | 5.215E−06 | 2.987E−04 | −3.074E−04 |
| 6 | 0 | 8.272E−08 | −1.343E−05 | −2.780E−05 |
| 4 | 2 | −2.522E−06 | −3.140E−05 | −1.312E−04 |
| 2 | 4 | 2.747E−05 | 5.979E−05 | −4.072E−04 |
| 0 | 6 | −9.104E−05 | 4.539E−04 | −1.536E−03 |

Coefficients of an aspheric surface of the optical surface which constitutes the projection lens in the projection see-through device of Example 5 are shown in Table 20.

TABLE 20

| | ASP1 | ASP2 | ASP3 |
|---|---|---|---|
| K | −1 | −1 | −1 |
| B4 | 1.730E−05 | 3.985E−04 | 3.628E−04 |
| B6 | −4.292E−05 | −1.324E−05 | −2.023E−05 |
| B8 | 4.667E−07 | 1.089E−07 | 3.764E−07 |

In Table 20, symbols K and Bi represent coefficients for specifying aspheric surfaces of aspheric surfaces APS1 to APS3 which are lens surfaces excluding the second lens surface 31b of the lens 31, that is, the surface of the symbol FFS7 among the two lenses 31 and 32 constituting the projection lens 30.

Figure 22:
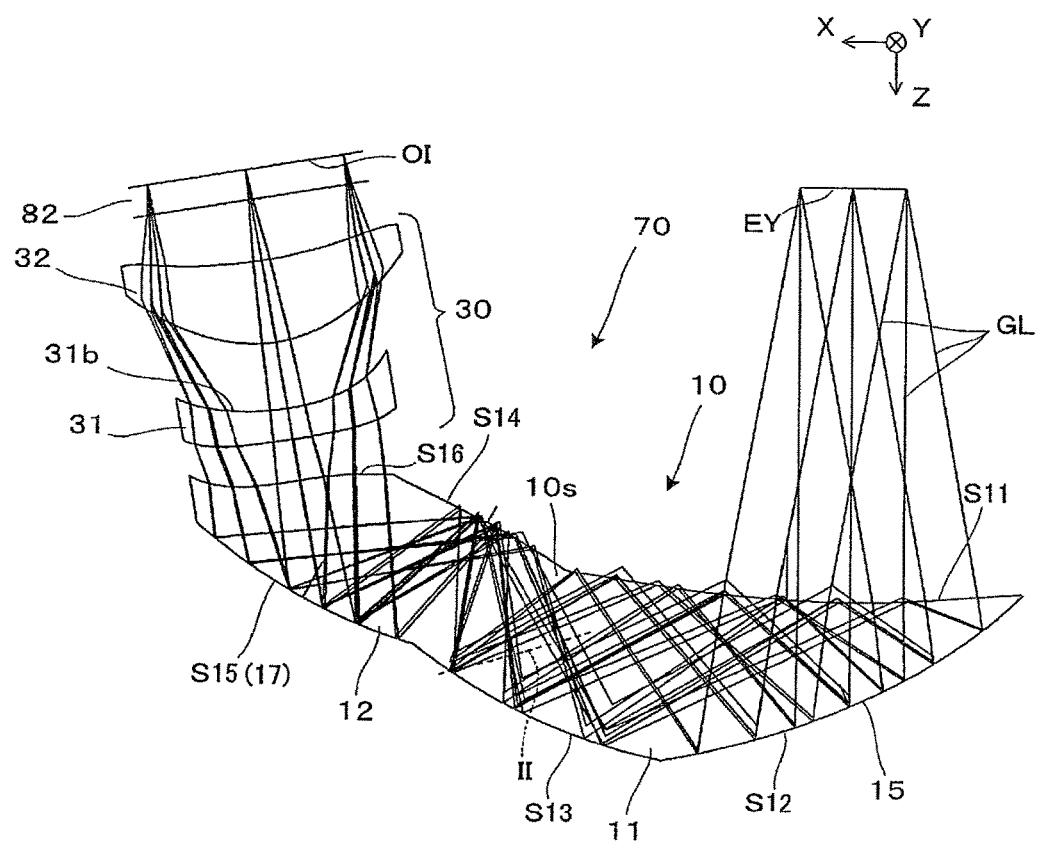
FIG. 22 is a diagram illustrating an optical system of Example 5.

FIG. 22 is a sectional view of the projection see-through device 70 of Example 5. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak positive refractive power, the fifth surface S15 having comparatively strong positive refractive power, and the sixth surface S16 having comparatively strong positive refractive power. The projection lens 30 includes the first lens 31 having negative refractive power, and the second lens 31 having positive refractive power. A specific specification of the optical system of Example 5 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fourth surface S14.

Figure 23A:
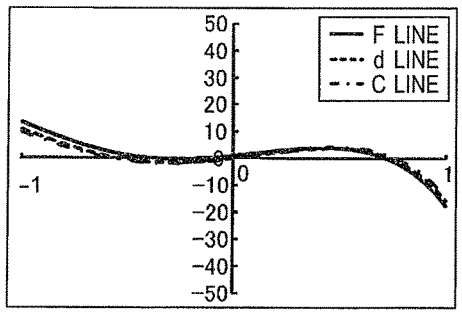
FIGS. 23A, 23B, 23C, 23D, 23E, and 23F are diagrams illustrating aberration of the optical system of Example 5.
Figure 23D:
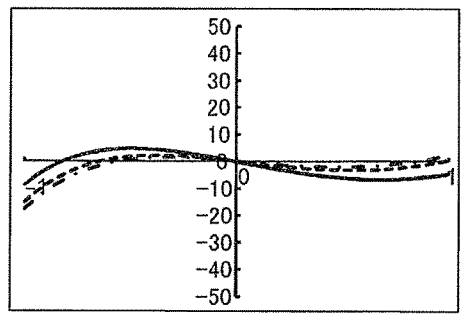
Figure 23B:
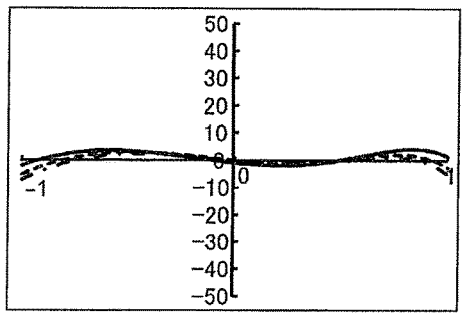
Figure 23E:
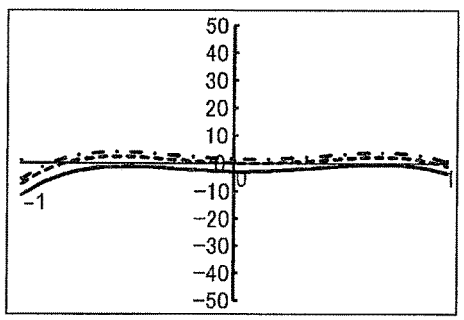
Figure 23C:
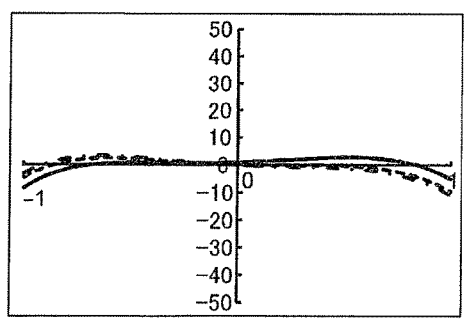
Figure 23F:
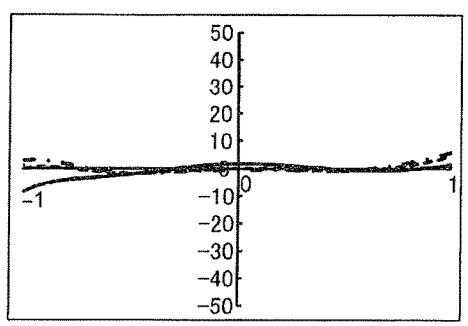
Figure 24A:
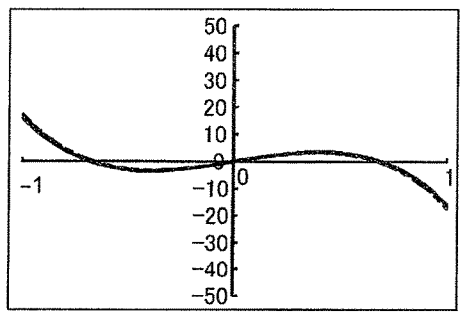
FIGS. 24A, 24B, 24C, 24D, 24E, and 24F are diagrams illustrating aberration of the optical system of Example 5.
Figure 24D:
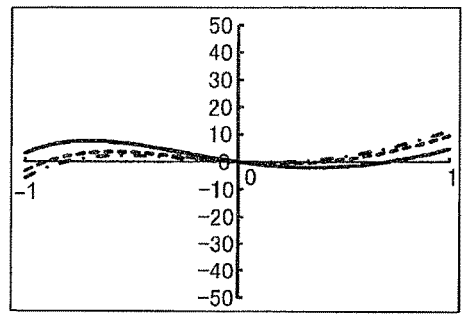
Figure 24B:
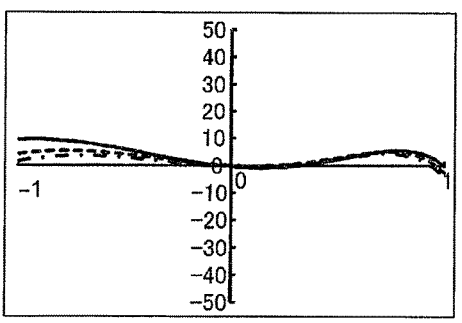
Figure 24E:
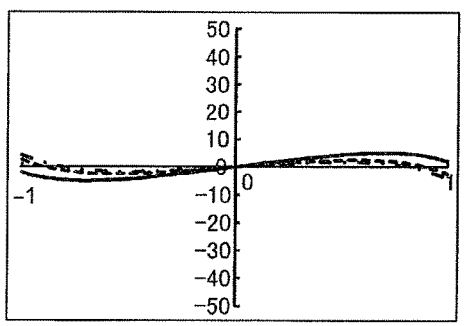
Figure 24C:
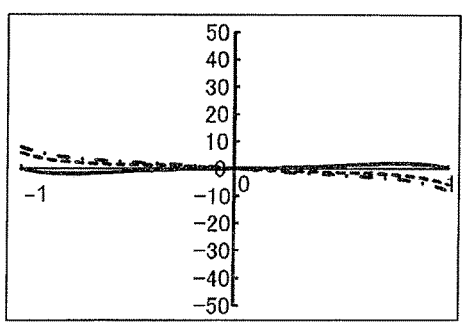
Figure 24F:
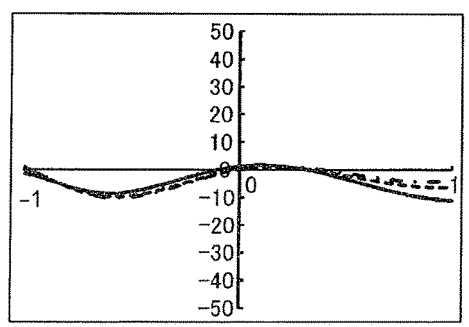

FIGS. 23A to 23F and 24A to 24F show aberration of Example 5. Specifically, FIGS. 23A and 23B show aberration in the Y and X directions at an azimuth of 10° in the X direction and 5.7° in the Y direction, FIGS. 23C and 23D show aberration in the Y and X directions at an azimuth of 0.0° in the X direction and 5.7° in the Y direction, and FIGS. 23E and 23F show aberration in the Y and X directions at an azimuth of −10° in the X direction and 5.7° in the Y direction. FIGS. 24A and 24B show aberration in the Y and X directions at an azimuth of 10° in the X direction and 0.0° in the Y direction, FIGS. 24C and 24D show aberration in the Y and X directions at an azimuth of 0.0° in the X direction and 0.0° in the Y direction, and FIGS. 24E and 24F show aberration in the Y and X directions at an azimuth of −10° in the X direction and 0.0° in the Y direction.

Figure 25:
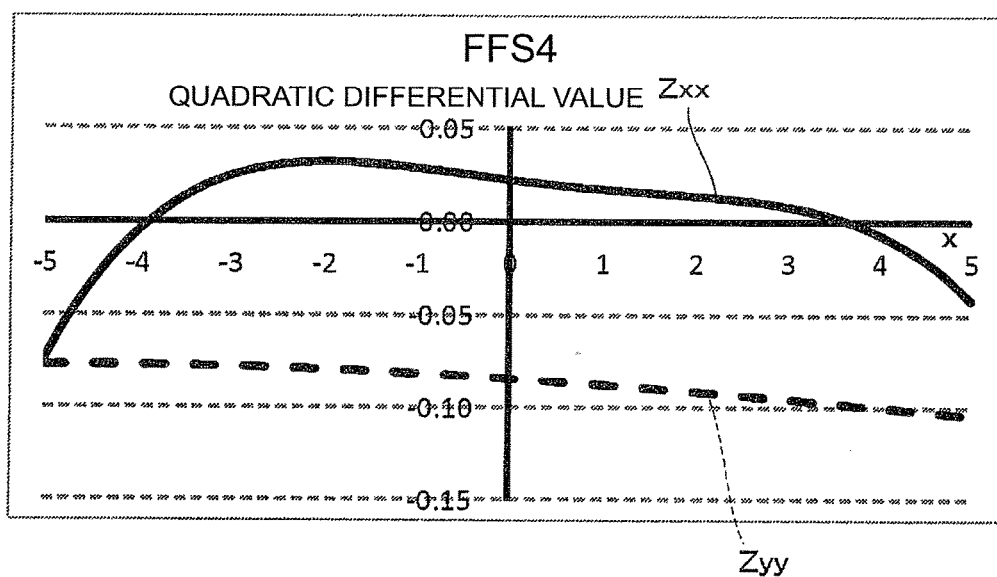
FIG. 25 is a diagram illustrating a quadratic differential value of a curved surface in a local coordinate of a fourth surface according to one embodiment.

FIG. 25 shows quadratic differential values of a curved surface in the local coordinate of the fourth surface S14 of Example 5. That is, a second derivative of a polynomial expression in which the values of Table 11 are assigned to the coefficients in the expression of the shape of the fourth surface S14 expressed by Expression (7) is shown. A solid-line curve Zxx in the drawing is a second derivative in the x direction of the local coordinate, and a broken-line curve Zyy in the drawing is a second derivative in the y direction of the local coordinate. In this case, in regard to the quadratic differential value a which is the value Zxx (0,0) at the origin of Zxx and the quadratic differential value b which is the value Zyy (0,0) at the origin of Zyy, a>0 and b<0. In other words, the shape of the fourth surface S14 expressed by Expression (7) has negative curvature in the x direction and positive curvature in the y direction. Specific numerical values are a=0.0221 (>0) and b=−0.0845 (<0).

In regard to Examples 1 to 3, numerical data relating to the conditional expressions (1) to (3) is summarized in Table 21.

In regard to Examples 1 to 3, numerical data relating to the interval between the first surface S11 and the third surface S13 and the inclination angle of the second surface S12 with respect to the first surface S11 is summarized in Table 22.

TABLE 22

|  | Example 1 | Example 2 | Example 3 | Example 4 | Example 5 |
|---|---|---|---|---|---|
| Interval between S11 and S13 | 10.00 | 10.00 | 9.00 | 10.00 | 8.50 |
| Inclination angle (°) of S12 with respect to S11 | 28 | 29 | 26 | 23.8 | 24 |

The conditional expression (3) affects diopter of the light guide member with respect to external light, and if the thickness of the light guide member is T and the refractive index is N, diopter Dx in the x-axis direction and diopter Dy in the y-axis direction on the optical axis of the light guide member are given by the following expressions.

$$Dx=2000(N-1)(A1_{2,0}-A3_{2,0}+(2T(N-1)/N)\times A1_{2,0}\times A3_{2,0})$$

$$Dy=2000(N-1)(A1_{0,2}-A3_{0,2}+(2T(N-1)/N)\times A1_{0,2}\times A3_{0,2})$$

In regard to Examples 1 to 3, numerical data relating to diopter is summarized in Table 23 based on the above-described expressions.

TABLE 23

|  | Example 1 | Example 2 | Example 3 | Example 4 | Example 5 |
|---|---|---|---|---|---|
| Diopter Dx (D: Diopter) | −0.34 | −0.21 | 0.31 | 0.00 | −0.07 |
| Diopter Dy (D: Diopter) | −0.34 | −0.06 | 0.23 | 0.00 | 0.03 |
| Thickness T of prism (mm) | 10 | 10 | 9 | 10 | 8.5 |
| Refractive index N | 1.525 | 1.525 | 1.525 | 1.525 | 1.525 |

Figure 26:
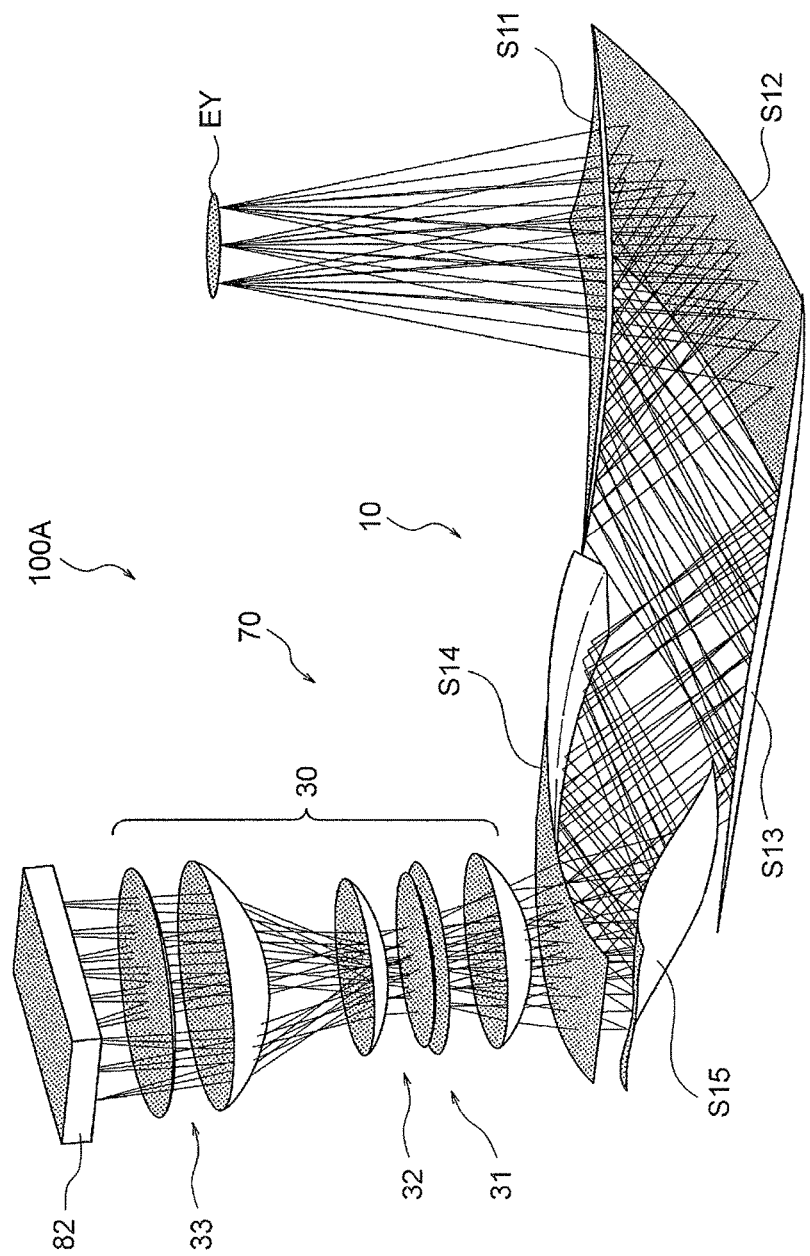
FIG. 26 is a perspective view showing each surface of an optical system for an example of a virtual image display apparatus according to one embodiment.

FIG. 26 is a perspective view showing respective surfaces of an optical system in regard to an example (corresponding to Example 1) of a virtual image display apparatus. As shown in the drawing, in the light guide member 10 of the virtual image display apparatus 100, it is understood that respective surfaces S11 to S15 having an optical function or lens surfaces constituting the projection lens 30 are curved

TABLE 21

| Coefficient value or conditional value | | Example 1 | Example 2 | Example 3 | Example 4 | Example 5 |
|---|---|---|---|---|---|---|
| | $A1_{2,0}$ | −6.070E−03 | −4.110E−03 | −1.254E−02 | 0.000E+00 | −9.590E−03 |
| | $A1_{0,2}$ | −6.428E−03 | −6.261E−03 | −1.031E−02 | 0.000E+00 | −3.895E−02 |
| | $A3_{2,0}$ | −5.518E−03 | −3.798E−03 | −1.191E−02 | 0.000E+00 | −9.015E−03 |
| | $A3_{0,2}$ | −5.843E−03 | −5.949E−03 | −9.899E−03 | 0.000E+00 | −3.174E−02 |
| Conditional expression (1) | $A1_{2,0} + A1_{0,2}$ | −1.2E−02 | −1.0E−02 | −2.3E−02 | 0.0E+00 | −4.9E−02 |
| Conditional expression (1) | $A3_{2,0} + A3_{0,2}$ | −1.1E−02 | −9.7E−03 | −2.2E−03 | 0.0E+00 | −4.1E−02 |
| Conditional expression (2) | $|A1_{2,0} - A1_{0,2}|$ | 3.6E−04 | 2.2E−03 | 2.2E−03 | 0.0E−00 | 2.9E−02 |
| Conditional expression (2) | $|A3_{2,0} - A3_{0,2}|$ | 3.3E−04 | 2.2E−03 | 2.0E−03 | 0.0E−00 | 2.3E−02 |
| Conditional expression (3) | $|A1_{2,0} - A3_{2,0}|$ | 5.5E−04 | 3.1E−04 | 6.3E−04 | 0.0E−00 | 5.8E−04 |
| Conditional expression (3) | $|A1_{0,2} - A3_{0,2}|$ | 5.8E−04 | 3.1E−04 | 4.1E−04 | 0.0E−00 | 7.2E−03 | surfaces which have curvature in the X and Y directions, and in particular, many of the surfaces constituting the light guide member 10 are free-form surfaces different in curvature between the X direction and the Y direction. This shape is provided, making it possible to perform optical path adjustment of desired video light or aberration correction. Though not shown in perspective view, in the respective examples other than Example 1, similarly, many of the surfaces constituting the light guide member 10 are free-form surfaces which have curvature in the X and Y directions. However, as described above, some of these surfaces may be flat surfaces.

Others

Although the invention has been described on the basis of the foregoing embodiment, the invention is not limited to the foregoing embodiment, and may be realized in various forms without departing from the spirit of the invention. For example, the following modifications may be made.

In the above description, although the origin of a local coordinate on an opposite-sign curvature curved surface is an opposite-sign curvature point, an opposite-sign curvature curved surface on which a different point is an opposite-sign curvature point may be used.

In the above description, although the half mirror layer (transflective film) 15 is formed in a horizontal rectangular area, the contour of the half mirror layer 15 may be appropriately changed according to usages and other specifications. The transmittance or reflectance of the half mirror layer 15 may be changed according to usages and others.

In the above description, although the distribution of display luminance in the video display element 82 is not particularly adjusted, when a luminance difference occurs depending on position, or the like, the distribution of display luminance may be adjusted unevenly or the like.

In the above description, although the video display element 82 which includes a transmissive liquid crystal display or the like is used as the image display device 80, the image display device 80 is not limited to the video display element 82 which includes a transmissive liquid crystal display or the like, and various devices may be used. For example, a configuration using a reflective liquid crystal display may be made, or a digital micro-mirror device or the like may be used, instead of the video display element 82 which includes the liquid crystal display or the like. A self-luminous element represented by an LED array or an OLED (organic EL) may be used as the image display device 80.

In the foregoing embodiment, although the image display device 80 which includes a transmissive liquid crystal display or the like is used, alternatively, a scanning image display device may be used.

Figure 27:
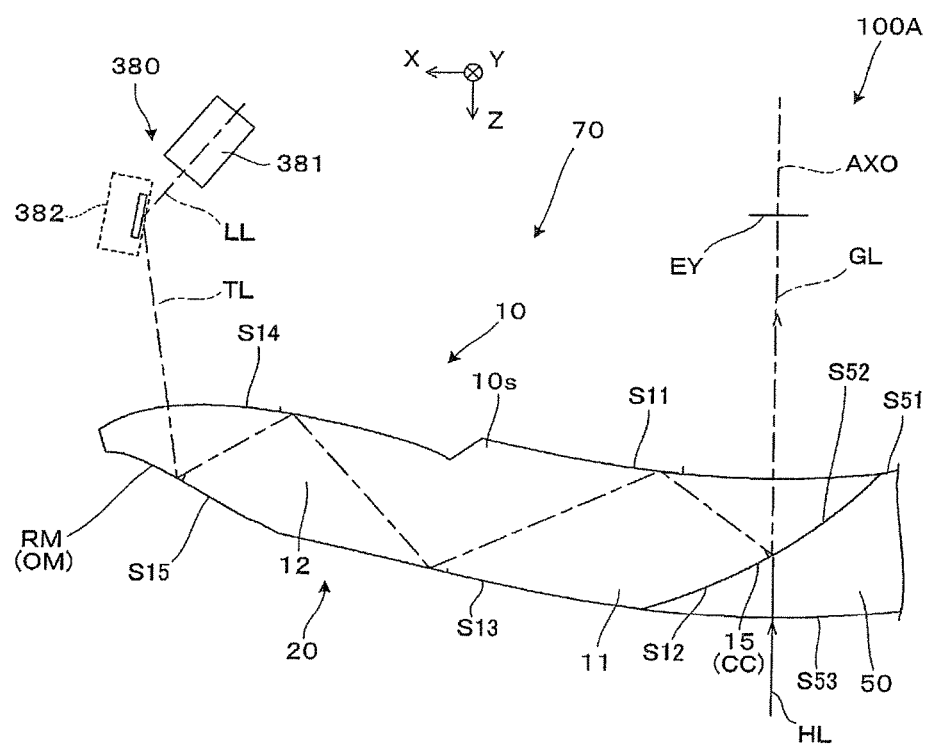
FIG. 27 is a diagram illustrating a virtual image display apparatus of a modification example according to one embodiment.

Specifically, as shown in FIG. 27, a first display device 100A which is a virtual image display apparatus includes a light guide device 20 and an image display device 380. The light guide device 20 corresponds to a first optical portion 103a in FIG. 1 of the foregoing embodiment, that is, corresponds to a portion where the light guide member 10 and the light transmission member 50 are bonded, thus, description thereof will be omitted. The image display device 380 is a device which forms signal light subjected to intensity modulation and emits signal light as scanning light TL, and has a signal light forming unit 381 and a scanning optical system 382.

The signal light forming unit 381 includes a light source, and emits signal light LL which is modulated and formed based on a control signal from a control circuit (not shown). The scanning optical system 382 scans and emits signal light LL passing through the signal light forming unit 381. Here, the scanning optical system 382 includes a MEMS mirror or the like, and performs two-dimensional scanning longitudinally and transversely changing the emission angle of a light beam (scanning light TL) by changing a posture in synchronization with modulation of signal light LL by the signal light forming unit 381 to adjust the optical path of signal light LL. With the above, the image display device 380 makes scanning light TL to be video light GL enter the light guide device 20, and makes scanning light TL scan the entire partial area of the second surface S12 in which the half mirror layer 15 is formed.

An operation of the first display device 100A shown in the drawing will be described. The image display device 380 emits signal light LL toward the fourth surface S14 as the light incidence surface of the light guide device 20 as scanning light TL as described above. The light guide device 20 guides scanning light TL passing through the fourth surface S14 due to total reflection or the like therein and makes scanning light TL reach the half mirror layer 15. At this time, scanning light TL is scanned on the surface of the half mirror layer 15, whereby a virtual image is formed by video light GL as a trace of scanning light TL. A person who mounts the apparatus captures the virtual image by the eye EY to visually recognize an image.

Figure 28A:
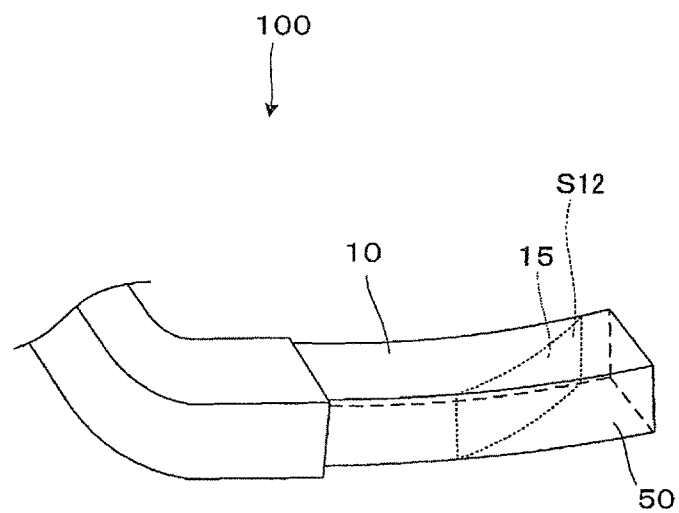
FIG. 28A is a perspective view illustrating another example of a light guide device and a virtual image display apparatus using the light guide device according to one embodiment.
Figure 28B:
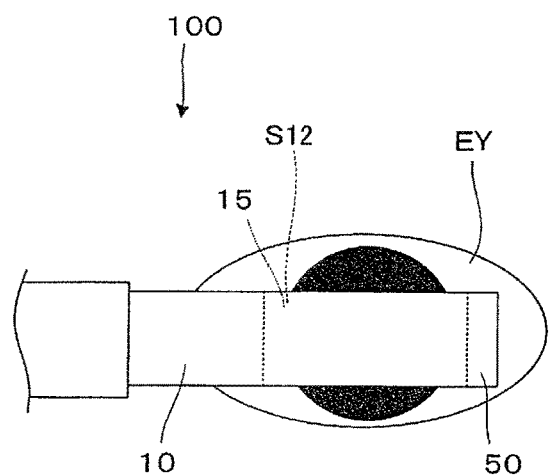
FIG. 28B is a front view.

In the foregoing embodiment, although the light guide member 10 and the light transmission member 50 which is the auxiliary optical block are configured to cover the entire front of the eye EY of the observer, the invention is not limited thereto, and for example, as shown in FIGS. 28A and 28B, a small configuration may be made in which a portion including the second surface S12, which is a curved surface shape having the half mirror layer 15, covers only a part of the eye EY, that is, covers a part of the front of the eye, and an uncovered portion is provided. In this case, even with a configuration in which the light guide member 10 and the light transmission member 50 are sufficiently small and a mirror for total reflection is arranged instead of the half mirror layer 15 without using the see-through manner, a person who mounts the apparatus can observe an external scene in the vicinity of the light guide member 10 and the light transmission member 50. In the case shown in the drawing, although the half mirror layer 15 is formed on the entire second surface S12 or the substantially entire second surface S12, the half mirror layer 15 may be formed only on a part of the second surface S12. In the example of FIG. 28B, although the half mirror layer 15 is arranged substantially in front of the eye EY, the half mirror layer 15 may be arranged to be shifted from the front, and the observer may move the eyes to visually recognize an image. For example, the position of the eye EY may be slightly lowered (the position of the light guide member 10 and the light transmission member 50 is slightly raised). In this case, the lower half of the eye EY is in a state of being viewed from the bottom of the light guide member 10 and the light transmission member 50.

In the above description, although the virtual image display apparatus 100 including a pair of display devices 100A and 100B has been described, a single display device may be provided. That is, a configuration may be made in which the projection see-through device 70 and the image display device 80 are provided only for either the right eye or the left eye to view an image with a single eye, instead of providing the set of the projection see-through device 70 and the image display device 80 for each of both the right eye and the left eye.

In the above description, although the interval between a pair of display devices 100A and 100B in the X direction has not been described, the interval between both display devices 100A and 100B is not limited to a fixed interval, and the interval may be adjusted by a mechanical mechanism or the like. That is, the interval between both display devices 100A and 100B in the X direction may be adjusted according to the eye width of the observer or the like.

In the foregoing description, although the half mirror layer 15 is a simple semitransmissive film (for example, a metal reflection film or a dielectric multilayer film), the half mirror layer 15 may be replaced with a flat or curved hologram element.

In the foregoing description, although a case where the virtual image display apparatus 100 is a head-mounted display has been specifically described, the virtual image display apparatus 100 may be modified into a head-up display.

In the above description, although video light is totally reflected by an interface with air and guided without providing a mirror, a half mirror, or the like on the first surface S11 and the third surface S13 of the light guide member 10, it is assumed that total reflection in the virtual image display apparatus 100 according to the invention includes reflection by a mirror coating or a half mirror film which is formed on the entire or a part of the first surface S11 or the third surface S13. For example, total reflection may include a case where, after the incidence angle of image light satisfies the total reflection condition, the mirror coating or the like is formed on the entire or a part of the first surface S11 or the third surface S13 to reflect substantially entire image light. Furthermore, the entire or a part of the first surface S11 or the third surface S13 may be coated with a mirror having a slight transmission property insofar as sufficiently bright image light can be obtained.

In the above description, although the light guide member 10 or the like extends in the horizontal direction in which the eyes EY are arranged, the light guide member 10 may be arranged to extend in the vertical direction. In this case, the light guide member 10 has a structure of being arranged in parallel, not in series. The configurations relating to the vertical direction and the horizontal direction may be appropriately replaced according to the direction in which video light (image light) is guided compared to the case in the above description.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A virtual image display apparatus comprising:
a light guide member which includes two or more non-axisymmetric curved surfaces and is a part of an optical system, an intermediate image being formed inside the light guide member, wherein at least one of the two or more non-axisymmetric curved surfaces of the light guide member comprises an opposite-sign curvature curved surface which includes at least one opposite-sign curvature point different in sign of curvature depending on direction such that the opposite-sign curvature curved surface has a positive or negative curvature in an x-direction from a point on the opposite-sign curvature curved surface and the opposite-sign curvature curved surface has a negative or positive curvature, respectively, in a y-direction from the point on the opposite-sign curvature curved surface, the opposite-sign curvature curved surface is a surface at a light incidence side of the light guide member and functions as a reflection surface for video light and also functions as a refraction surface for the video light, wherein the light guide member comprises:
a first surface;
a second surface;
a third surface arranged to face the first surface; and
a video element which generates the video light, wherein the video light is reflected by the third surface, is reflected by the first surface, is reflected by the second surface, is transmitted through the first surface, and reaches an observation side.

2. The virtual image display apparatus according to claim 1, wherein the light guide member causes the video light and external light to be visually recognized, and
when an external scene is visually recognized through the first surface and the third surface, diopter is substantially 0.

3. The virtual image display apparatus according to claim 1, wherein, in the light guide member, the opposite-sign curvature curved surface is located between the first surface and the third surface when following a plurality of surfaces constituting the light guide member around the light guide member.

4. The virtual image display apparatus according to claim 1, wherein, for each surface in the light guide member, when an expression of a surface shape is expanded as a polynomial in terms of orthogonal coordinates x and y extending in a tangential direction with the origin of each surface as a reference, and the surface shape is specified as z, and
in terms of the expression of the opposite-sign curvature curved surface, when a quadratic differential value in an x direction of z at the origin is a and a quadratic differential value in a y direction of z at the origin is b, the relationship a<0<b or b<0<a is established.

5. The virtual image display apparatus according to claim 4, wherein, for the quadratic differential value of the opposite-sign curvature curved surface in the light guide member, $1 \times 10^{-3} < |a-b|$ is satisfied.

6. The virtual image display apparatus according to claim 1, wherein, when an expression of a surface shape is expanded as a polynomial in terms of orthogonal coordinates x and y extending in a tangential direction from the origin with the origin of each surface constituting the optical system as a reference, and the coefficient of a term $x^m \cdot y^n$ of a polynomial expression representing a k-th surface is $Ak_{m,n}$, the following conditions of (1) to (3):

$$-10^{-1} < A1_{0,2} + A1_{2,0} < 10^{-2} \text{ and } -10^{-1} < A3_{0,2} + A3_{2,0} < 10^{-2} \quad (1)$$

$$|A1_{2,0} - A1_{0,2}| < 10^{-1} \text{ and } |A3_{2,0} - A3_{0,2}| < 10^{-1} \quad (2)$$

$$|A1_{2,0} - A3_{2,0}| < 10^{-2} \text{ and } |A1_{0,2} - A3_{0,2}| < 10^{-2} \quad (3)$$

are satisfied.

7. The virtual image display apparatus according to claim 1, wherein a half mirror is formed on the second surface, the video light is provided to an observer, a light transmission member is arranged integrally outside the second surface, diopter to external light is substantially set to 0, and external light and video light are provided to the observer in an overlapping manner.

8. The virtual image display apparatus according to claim 1, further comprising:
a projection lens which makes video light from the video element enter the light guide member,
wherein at least a part of the light guide member and the projection lens constitute a relay optical system which forms the intermediate image.

9. The virtual image display apparatus according to claim 8,
wherein the projection lens is constituted by an axisymmetric lens and includes at least one aspheric surface.

10. The virtual image display apparatus according to claim 8,
wherein the projection lens includes at least one non-axisymmetric aspheric surface.

11. The virtual image display apparatus according to claim 1,
wherein the optical system including the light guide member covers a part in front of the eyes of the observer, and a portion where the front of the eyes is not covered is provided.

12. The virtual image display apparatus according to claim 1,
wherein the video element has a signal light forming portion which emits signal light modulated corresponding to an image, and a scanning optical system which scans signal light entering from the signal light forming portion to emit signal light as scanning light.

13. The virtual image display apparatus according to claim 1, wherein the first and third surfaces are non-axisymmetric curved surfaces.

14. A virtual image display apparatus comprising:
a light guide member configured to form an intermediate image and comprising:
a first surface;
a third surface arranged with the first surface so that the first and third surfaces face each other, wherein the light guide member has an opposite-sign curvature curved surface which includes different curvatures depending on direction such that the opposite-sign curvature curved surface has a positive or negative curvature in an x-direction from a point on the opposite-sign curvature curved surface and the opposite-sign curvature curved surface has a negative or positive curvature, respectively, in a y-direction from the point on the opposite-sign curvature curved surface, the opposite-sign curvature curved surface is a surface at a light incidence side of the light guide member and functions as a reflection surface for video light and also functions as a refraction surface for the video light; and
a video element which generates the video light, wherein the video light is reflected by the third surface, is reflected by the first surface, is reflected by a second surface, is transmitted through the first surface, and then reaches an observation side.

15. A method of displaying an image, the method comprising:
providing a light guide member having two or more non-axisymmetric curved surfaces, the light guide member comprising:
a first surface;
a second surface; and
a third surface arranged to face the first surface, wherein the light guide member is a part of an optical system and is configured to form an intermediate image inside the light guide member, and wherein the light guide member has an opposite-sign curvature curved surface which includes at least one opposite-sign curvature point different in sign of curvature depending on direction such that the opposite-sign curvature curved surface has a positive or negative curvature in an x-direction from a point on the opposite-sign curvature curved surface and the opposite-sign curvature curved surface has a negative or positive curvature, respectively, in a y-direction from the point on the opposite-sign curvature curved surface, the opposite-sign curvature curved surface is a surface at a light incidence side of the light guide member and functions as a reflection surface for video light and also functions as a refraction surface for the video light;
generating the video light from a video element; and
directing the video light to the light guide member so that:
(1) the video light is totally reflected by the third surface, (2) is totally reflected by the first surface, (3) is reflected by the second surface, (4) is transmitted through the first surface, and (5) then reaches an observation side.

16. The method of claim 15, wherein the directing comprises directing the video light to the light guide member so that the video light:
(1) is reflected by the third surface,
(2) is reflected by the first surface after being reflected from the third surface,
(3) is reflected by the second surface after being reflected from the first surface,
(4) is transmitted through the first surface after being reflected from the second surface, and
(5) reaches an observation side from the second surface.

17. The virtual image display apparatus according to claim 1,
wherein the x direction corresponds to a first direction, and in the y direction corresponding to a second direction orthogonal to the first direction.

18. The virtual image display apparatus according to claim 17,
wherein the first direction is a horizontal direction defined by a direction of alignment of eyes along the face.

19. The virtual image display apparatus according to claim 1, wherein:
the opposite-sign curvature curved surface includes different curvatures located at the light incidence side of light guide member and depending on direction, and
the x- and y-directions are orthogonal to each other.

* * * * *